(12) United States Patent
Wu et al.

(10) Patent No.: US 11,818,727 B2
(45) Date of Patent: Nov. 14, 2023

(54) MULTI-RADIO ACCESS TECHNOLOGY SCHEDULING OF SIDELINK INTERFACE

(71) Applicant: QUALCOMM Incorporated, San Diego, CA (US)

(72) Inventors: Zhibin Wu, Los Altos, CA (US); Hong Cheng, Basking Ridge, NJ (US); Sudhir Kumar Baghel, Hillsborough, NJ (US); Michaela Vanderveen, Tracy, CA (US); Junyi Li, Fairless Hills, PA (US); Shailesh Patil, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/403,637

(22) Filed: Aug. 16, 2021

(65) Prior Publication Data

US 2021/0392628 A1    Dec. 16, 2021

Related U.S. Application Data

(63) Continuation of application No. 16/276,301, filed on Feb. 14, 2019, now Pat. No. 11,096,161.
(Continued)

(51) Int. Cl.
*H04W 72/23* (2023.01)
*H04W 48/10* (2009.01)
(Continued)

(52) U.S. Cl.
CPC .......... *H04W 72/23* (2023.01); *H04L 5/0053* (2013.01); *H04L 5/0092* (2013.01); *H04W 48/10* (2013.01);
(Continued)

(58) Field of Classification Search
CPC .. H04B 1/406; H04B 7/15; H04B 1/76; H04L 5/0053–0057; H04L 5/0092;
(Continued)

(56) References Cited

U.S. PATENT DOCUMENTS 9,338,700 B2    5/2016  Schulist et al.
9,854,478 B2   12/2017  Ozturk et al.
(Continued)

FOREIGN PATENT DOCUMENTS

CN    107211443 A     9/2017
EP      3244677 A1   11/2017
(Continued)

OTHER PUBLICATIONS

International Search Report and Written Opinion—PCT/US2019/018282—ISA/EPO—dated Jun. 3, 2019.
(Continued)

*Primary Examiner* — Thomas R Cairns
(74) *Attorney, Agent, or Firm* — Danai Nelislie Mhembere; Holland & Hart LLP

(57) ABSTRACT

Methods, systems, and devices for wireless communication are described. A user equipment (UE) may receive a message indicating that a base station supports allocating resources for sidelink communications using a first radio access technology (RAT) and a second RAT that is different from the first RAT. The UE may transmit a sidelink information message to the base station using the first RAT that indicates that sidelink communications are to be performed using either the second RAT or both the first RAT and the second RAT. The UE may receive a configuration message from the base station that comprises an identifier for the sidelink communications and an indication of available sidelink resources. The UE may transmit, based at least in part on the configuration message, a request for resources
(Continued)

within the available sidelink resources, the request indicating the identifier and a buffer status report (BSR).

22 Claims, 17 Drawing Sheets

Related U.S. Application Data

(60) Provisional application No. 62/637,239, filed on Mar. 1, 2018.

(51) Int. Cl.
  *H04L 5/00* (2006.01)
  *H04W 72/21* (2023.01)
  *H04W 48/12* (2009.01)
  *H04W 92/18* (2009.01)
  *H04W 88/06* (2009.01)
  *H04W 76/14* (2018.01)
  *H04W 88/04* (2009.01)

(52) U.S. Cl.
  CPC ............ *H04W 72/21* (2023.01); *H04W 48/12* (2013.01); *H04W 76/14* (2018.02); *H04W 88/04* (2013.01); *H04W 88/06* (2013.01); *H04W 92/18* (2013.01)

(58) Field of Classification Search
  CPC .... H04L 5/0001; H04L 5/0048; H04W 8/005; H04W 16/26; H04W 48/10; H04W 48/12; H04W 72/042; H04W 72/1284; H04W 72/14; H04W 74/0866; H04W 76/14; H04W 84/047; H04W 84/18; H04W 88/04; H04W 88/06; H04W 92/18; H04W 72/21; H04W 72/23–232

See application file for complete search history.

(56) References Cited

U.S. PATENT DOCUMENTS

| | | |
|---|---|---|
| 10,477,620 B2 | 11/2019 | Xiong et al. |
| 11,096,161 B2 | 8/2021 | Wu et al. |
| 2016/0088624 A1 | 3/2016 | Lee et al. |
| 2016/0157254 A1* | 6/2016 | Novlan ................. H04W 72/10 370/329 |
| 2016/0309427 A1 | 10/2016 | Cho et al. |
| 2017/0150490 A1 | 5/2017 | Chen et al. |

FOREIGN PATENT DOCUMENTS

| | | |
|---|---|---|
| WO | WO-2014153434 | 9/2014 |
| WO | WO-2015109204 | 7/2015 |
| WO | WO2016137532 A1 | 9/2016 |
| WO | WO-2016163762 A1 | 10/2016 |
| WO | WO2017030520 A1 | 2/2017 |
| WO | WO-2017111987 A1 | 6/2017 |
| WO | WO-2017171250 A2 | 10/2017 |
| WO | WO-2017192006 A2 | 11/2017 |

OTHER PUBLICATIONS

Osman N.C., et al., "Smart Mobility Management for D2D Communications in 5G Networks", IEEE, Nokia Research Center, Nokia Corp, Espoo, Finland, published, Oct. 23, 2014, pp. 219-223.
European Search Report—EP23163630—Search Authority—The Hague—dated Jun. 16, 2023.

* cited by examiner

US 11,818,727 B2

MULTI-RADIO ACCESS TECHNOLOGY SCHEDULING OF SIDELINK INTERFACE

CROSS REFERENCES

The present Application for Patent is a Continuation of U.S. patent application Ser. No. 16/276,301 by WU et al., entitled "MULTI-RADIO ACCESS TECHNOLOGY SCHEDULING OF SIDELINK INTERFACE" filed Feb. 14, 2019, which claims the benefit of U.S. Provisional Patent Application No. 62/637,239 by WU et al., entitled "MULTI-RADIO ACCESS TECHNOLOGY SCHEDULING OF SIDELINK INTERFACE," filed Mar. 1, 2018, assigned to the assignee hereof, and expressly incorporated herein.

BACKGROUND

The following relates generally to wireless communications, and more specifically to multi-radio access technology (RAT) scheduling of sidelink interface.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may include or support networks used for direct communications between wireless devices, e.g., direct communications between UEs. Examples of direct communications include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, and the like. The direct communications are generally referred to as sidelink communications and may utilize a PC5 interface. Typically, each RAT, such as an LTE RAT, a NR RAT, a millimeter wave (mmW) RAT, and the like, has its own associated set of protocols and/or configurations that supports the PC5 interface.

Some wireless communication systems may be configured to support network-assisted sidelink communications (e.g., mode 3 support where the base station allocates the resources for the sidelink communications) and/or autonomous sidelink communications (e.g., mode 4 support where the UEs pick the sidelink resources from a resource pool of available sidelink resources). However, some deployment scenarios may not include a base station for every available RAT being deployed in every location. This may create problems for a UE that supports sidelink communications using multiple RATs, such as when the home base station does not support allocating sidelink resources for more than one RAT.

SUMMARY

The described techniques relate to improved methods, systems, devices, and apparatuses that support multi-radio access technology (RAT) scheduling of sidelink interfaces. Generally, the described techniques provide an efficient mechanism that supports evolving PC5 interfaces between different RATs (e.g., a first RAT such as a Long Term Evolution (LTE) RAT and a second RAT such as a new radio (NR) RAT). In some aspects, this may include a base station that transmits a signal to one or more user equipments (UEs) within its coverage area. The signal may indicate support at the base station for the allocation of sidelink resources on multiple RATs. For example, the base station may include a flag or a field of a system information block (SIB) message that provides the indication of the dual-RAT support. A UE may determine that it has to perform sidelink communications using one or more RATs (e.g., using the second RAT or the second RAT and the first RAT). The UE may transmit an indication to the base station that indicates the UE intends to perform the sidelink communications. The indication may be in, for example, a sidelink information message. In some aspects, the UE may communicate the sidelink information message to the base station using the first RAT. The base station may receive the indication and respond by transmitting a configuration message that includes an identifier for the sidelink communications, providing some indication of resources that might be available for sidelink communications, and the like.

Accordingly, the UE may respond by transmitting a resource request to the base station. The resource request may include one or more buffer status reports (BSRs). The BSRs may be selected or otherwise configured based at least in part on whether the UE wants to perform sidelink communications using just the second RAT or using both of the first and second RATs. For example, the UE may include a legacy BSR requesting resources for LTE RAT sidelink communications and/or an updated BSR requesting resources for LTE RAT and NR sidelink communications. As another example, the UE may include a first BSR for the second RAT that is associated with a first transmission type and a second BSR for the second RAT that is associated with a second transmission type. Accordingly, the base station may receive the resource request and respond by providing one or more scheduling grants of sidelink resources to the UE. Thus, the base station may allocate sidelink resources that support sidelink communications using more than one RAT.

A method of wireless communication at a UE is described. The method may include receiving a message indicating that a base station supports allocating resources for sidelink communications using a first RAT and a second RAT that is different from the first RAT. The method may also include transmitting a sidelink information message to the base station using the first RAT that indicates that sidelink communications are to be performed using either the second RAT or both the first RAT and the second RAT. The method may further include receiving a configuration message from the base station that comprises an identifier for the sidelink communications and an indication of available sidelink resources. The method may also include transmitting, based at least in part on the configuration message, a request for resources within the available sidelink resources, the request indicating the identifier and a BSR configured based at least in part on whether the request for resources is associated with the second RAT or both the first RAT and the second RAT.

An apparatus for wireless communication at a UE is described. The apparatus may include a processor, memory in electronic communication with the processor, and instructions stored in the memory. The instructions may be executable by the processor to cause the apparatus to receive a message indicating that a base station supports allocating resources for sidelink communications using a first RAT and a second RAT that is different from the first RAT and transmit a sidelink information message to the base station using the first RAT that indicates that sidelink communications are to be performed using either the second RAT or both the first RAT and the second RAT. The instructions may also be executable by the processor to receive a configuration message from the base station that comprises an identifier for the sidelink communications and an indication of available sidelink resources and transmit, based at least in part on the configuration message, a request for resources within the available sidelink resources, the request indicating the identifier and a BSR configured based at least in part on whether the request for resources is associated with the second RAT or both the first RAT and the second RAT.

Another apparatus for wireless communication at a UE is described. The apparatus may include means for receiving a message indicating that a base station supports allocating resources for sidelink communications using a first RAT and a second RAT that is different from the first RAT and means for transmitting a sidelink information message to the base station using the first RAT that indicates that sidelink communications are to be performed using either the second RAT or both the first RAT and the second RAT. The apparatus may also include means for receiving a configuration message from the base station that comprises an identifier for the sidelink communications and an indication of available sidelink resources and means for transmitting, based at least in part on the configuration message, a request for resources within the available sidelink resources, the request indicating the identifier and a BSR configured based at least in part on whether the request for resources is associated with the second RAT or both the first RAT and the second RAT.

A non-transitory computer-readable medium storing code for wireless communication at a UE is described. The code may include instructions executable by a processor to receive a message indicating that a base station supports allocating resources for sidelink communications using a first RAT and a second RAT that is different from the first RAT and transmit a sidelink information message to the base station using the first RAT that indicates that sidelink communications are to be performed using either the second RAT or both the first RAT and the second RAT. The code may also include instructions executable by the processor to receive a configuration message from the base station that comprises an identifier for the sidelink communications and an indication of available sidelink resources and transmit, based at least in part on the configuration message, a request for resources within the available sidelink resources, the request indicating the identifier and a BSR configured based at least in part on whether the request for resources is associated with the second RAT or both the first RAT and the second RAT.

Some examples of the method, apparatuses, and non-transitory computer-readable medium described herein may further include operations, features, means, or instructions for receiving downlink control information (DCI) in a control channel. Some examples of the method, apparatuses, and non-transitory computer-readable medium described herein may further include operations, features, means, or instructions for descrambling the DCI using the identifier to obtain a resource grant allocating resources within the available sidelink resources. Some examples of the method, apparatuses, and non-transitory computer-readable medium described herein may further include operations, features, means, or instructions for performing the sidelink communications using the allocated resources.

In some examples of the method, apparatuses, and non-transitory computer-readable medium described herein, the identifier includes a first identifier associated with the first RAT and a second identifier associated with the second RAT.

Some examples of the method, apparatuses, and non-transitory computer-readable medium described herein may further include operations, features, means, or instructions for receiving DCI in a control channel. Some examples of the method, apparatuses, and non-transitory computer-readable medium described herein may further include operations, features, means, or instructions for descrambling the DCI using the first identifier for determining whether the DCI includes a resource grant allocating resources to the first RAT. Some examples of the method, apparatuses, and non-transitory computer-readable medium described herein may further include operations, features, means, or instructions for descrambling the DCI using the second identifier for determining whether the DCI includes a resource grant allocating resources to the second RAT.

In some examples of the method, apparatuses, and non-transitory computer-readable medium described herein, the identifier includes a first identifier associated with the second RAT and a second identifier associated with the second RAT.

Some examples of the method, apparatuses, and non-transitory computer-readable medium described herein may further include operations, features, means, or instructions for receiving DCI in a control channel. Some examples of the method, apparatuses, and non-transitory computer-readable medium described herein may further include operations, features, means, or instructions for descrambling the DCI using the first identifier for determining whether the DCI includes a resource grant allocating resources to the second RAT associated with a first transmission type. Some examples of the method, apparatuses, and non-transitory computer-readable medium described herein may further include operations, features, means, or instructions for descrambling the DCI using the second identifier for determining whether the DCI includes a resource grant allocating resources to the second RAT associated with a second transmission type.

In some examples of the method, apparatuses, and non-transitory computer-readable medium described herein, the sidelink information message indicates a transmission type, a traffic profile, a quality of service indicator, a service type indicator, or any combination thereof, for the sidelink communications.

In some examples of the method, apparatuses, and non-transitory computer-readable medium described herein, the BSR indicates a buffer status for the first RAT and a buffer status for the second RAT.

In some examples of the method, apparatuses, and non-transitory computer-readable medium described herein, the configuration message indicates a mapping assignment for a logical channel associated with the first RAT or the second RAT.

In some examples of the method, apparatuses, and non-transitory computer-readable medium described herein, the identifier may be at least one of a logical channel identifier (LCID) or a radio network temporary identifier (RNTI). In some examples of the method, apparatuses, and non-transitory computer-readable medium described herein, the configuration message may be a radio resource control (RRC) message.

In some examples of the method, apparatuses, and non-transitory computer-readable medium described herein, the message may be a SIB message that may be broadcast by the base station. In some examples of the method, apparatuses, and non-transitory computer-readable medium described herein, the first RAT may be an LTE RAT and the second RAT may be a NR RAT.

A method of wireless communication at a base station is described. The method may include receiving a sidelink information message from a UE using a first RAT indicating that sidelink communications are to be performed using a second RAT or both the first RAT and the second RAT and transmitting a configuration message to the UE that comprises an identifier for the sidelink communications and an indication of available sidelink resources. The method may also include receiving, based at least in part on the configuration message, a request for resources within the available sidelink resources, the request indicating the identifier and a BSR configured based at least in part on whether the request for resources is associated with the second RAT or both the first RAT and the second RAT.

An apparatus for wireless communication at a base station is described. The apparatus may include a processor, memory in electronic communication with the processor, and instructions stored in the memory. The instructions may be executable by the processor to cause the apparatus to receive a sidelink information message from a UE using a first RAT indicating that sidelink communications are to be performed using a second RAT or both the first RAT and the second RAT and transmit a configuration message to the UE that comprises an identifier for the sidelink communications and an indication of available sidelink resources The instructions may also be executable by the processor to receive, based at least in part on the configuration message, a request for resources within the available sidelink resources, the request indicating the identifier and a BSR configured based at least in part on whether the request for resources is associated with the second RAT or both the first RAT and the second RAT.

Another apparatus for wireless communication at a base station is described. The apparatus may include means for receiving a sidelink information message from a UE using a first RAT indicating that sidelink communications are to be performed using a second RAT or both the first RAT and the second RAT and means for transmitting a configuration message to the UE that comprises an identifier for the sidelink communications and an indication of available sidelink resources. The apparatus may also include means for receiving, based at least in part on the configuration message, a request for resources within the available sidelink resources, the request indicating the identifier and a BSR configured based at least in part on whether the request for resources is associated with the second RAT or both the first RAT and the second RAT.

A non-transitory computer-readable medium storing code for wireless communication at a base station is described. The code may include instructions executable by a processor to receive a sidelink information message from a UE using a first RAT indicating that sidelink communications are to be performed using a second RAT or both the first RAT and the second RAT and transmit a configuration message to the UE that comprises an identifier for the sidelink communications and an indication of available sidelink resources. The code may also include instructions executable by the processor to receive, based at least in part on the configuration message, a request for resources within the available sidelink resources, the request indicating the identifier and a BSR configured based at least in part on whether the request for resources is associated with the second RAT or both the first RAT and the second RAT.

Some examples of the method, apparatuses, and non-transitory computer-readable medium described herein may further include operations, features, means, or instructions for generating a resource grant allocating resources within the available sidelink resources to perform the sidelink communications. Some examples of the method, apparatuses, and non-transitory computer-readable medium described herein may further include operations, features, means, or instructions for scrambling the resource grant using the identifier to generate a scrambled resource grant. Some examples of the method, apparatuses, and non-transitory computer-readable medium described herein may further include operations, features, means, or instructions for transmitting, in a control channel, DCI that comprises the scrambled resource grant.

In some examples of the method, apparatuses, and non-transitory computer-readable medium described herein, the identifier includes a first identifier associated with the first RAT and a second identifier associated with the second RAT.

Some examples of the method, apparatuses, and non-transitory computer-readable medium described herein may further include operations, features, means, or instructions for generating a first resource grant allocating first resources within the available sidelink resources to the first RAT and a second resource grant allocating second resources within the available sidelink resources to the second RAT. Some examples of the method, apparatuses, and non-transitory computer-readable medium described herein may further include operations, features, means, or instructions for scrambling the first resource grant using the first identifier to generate a first scrambled resource grant. Some examples of the method, apparatuses, and non-transitory computer-readable medium described herein may further include operations, features, means, or instructions for scrambling the second resource grant using the second identifier to generate a second scrambled resource grant. Some examples of the method, apparatuses, and non-transitory computer-readable medium described herein may further include operations, features, means, or instructions for transmitting, in a control channel, DCI that comprises the first scrambled resource grant and the second scrambled resource grant.

In some examples of the method, apparatuses, and non-transitory computer-readable medium described herein, the identifier includes a first identifier associated with the second RAT and a second identifier associated with the second RAT.

Some examples of the method, apparatuses, and non-transitory computer-readable medium described herein may further include operations, features, means, or instructions for generating a first resource grant allocating first resources within the available sidelink resources to the second RAT and a second resource grant allocating second resources within the available sidelink resources to the second RAT. Some examples of the method, apparatuses, and non-transitory computer-readable medium described herein may further include operations, features, means, or instructions for scrambling the first resource grant using the first identifier to generate a first scrambled resource grant. Some examples of the method, apparatuses, and non-transitory computer-readable medium described herein may further include operations, features, means, or instructions for scrambling the second resource grant using the second identifier to generate a second scrambled resource grant. Some examples of the method, apparatuses, and non-transitory computer-readable medium described herein may further include operations, features, means, or instructions for transmitting, in a control channel, downlink control information (DCI) that comprises the first scrambled resource grant and the second scrambled resource grant.

In some examples of the method, apparatuses, and non-transitory computer-readable medium described herein, the BSR indicates a buffer status for the first RAT and a buffer status for the second RAT.

In some examples of the method, apparatuses, and non-transitory computer-readable medium described herein, the sidelink information message identifies a transmission type, a traffic profile, a quality of service indicator, a service type indicator, or any combination thereof, for the sidelink communications.

In some examples of the method, apparatuses, and non-transitory computer-readable medium described herein, the identifier may be at least one of a LCID or a RNTI. In some examples of the method, apparatuses, and non-transitory computer-readable medium described herein, the configuration message may be an RRC message. Some examples of the method, apparatuses, and non-transitory computer-readable medium described herein may further include operations, features, means, or instructions for transmitting a SIB message indicating support for allocating resources for sidelink communications using the first RAT and the second RAT.

In some examples of the method, apparatuses, and non-transitory computer-readable medium described herein, the first RAT may be an LTE RAT and the second RAT may be a NR RAT.

DETAILED DESCRIPTION

Figure 1:
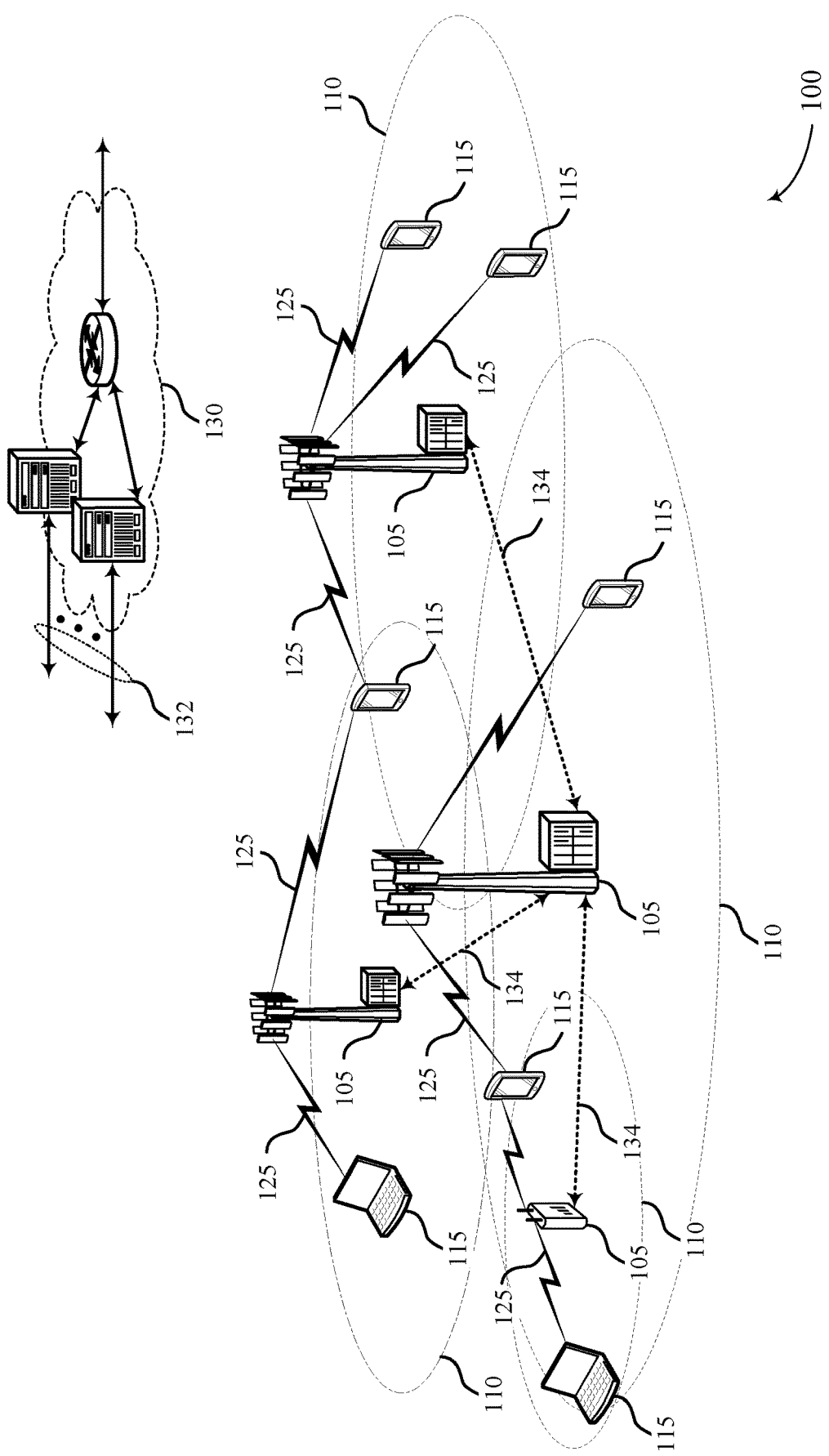
FIG. 1 illustrates an example of a wireless communications system that supports multi-radio access technology (RAT) scheduling of sidelink interface in accordance with aspects of the present disclosure.

The described techniques relate to improved methods, systems, devices, and apparatuses that support multi-radio access technology (RAT) scheduling of sidelink interface. Generally, the described techniques provide an efficient mechanism that supports evolving PC5 interfaces between different RATs (e.g., a first RAT such as a Long Term Evolution (LTE) RAT and a second RAT such as a new radio (NR) RAT). In some aspects, a user equipment (UE) may receive a signal indicating that a base station supports the allocation of sidelink resources on multiple RATs, and the UE may coordinate with the base station to obtain sidelink resources using more than one RAT.

Some wireless communication systems support sidelink communications. Broadly, sidelink communications include communications between wireless devices, such as between UEs. Sidelink communications, such as those performed using PC5 interfaces, may be utilized in a device-to-device (D2D) communication scenario, in a vehicle-based communication scenario (e.g., vehicle to everything (V2X), vehicle to vehicle (V2V), etc., communications), and the like. Generally, sidelink communications can be either network-assisted or autonomous. Network-assisted sidelink communications typically include a base station allocating sidelink resources (e.g., resources in the time, frequency, and/or spatial domain) to the UEs to use for sidelink communications. Autonomous sidelink communications are typically associated with a resource pool that is made available to UEs to select the sidelink resources from.

Wireless communication systems may be heterogeneous in that multiple RATs may be deployed. For example, an LTE RAT may be deployed in place of, alongside, or overlapping with a NR RAT. However, deploying multiple RATs also has an associated increase in cost, e.g., such as financial cost in terms of additional equipment, cost in terms of over the air resources, cost in terms of potential conflicts or collisions, and the like. Moreover, such separate deployments may not necessarily support scheduling sidelink communication resources to UEs that are equipped to support sidelink communications using different RATs.

Aspects of the disclosure are initially described in the context of a wireless communications system and provide for implementation of an efficient technique that allows a base station to support allocating sidelink resources to UEs using different RATs. For example, the base station may be configured to support scheduling of sidelink resources for a first RAT (e.g., an LTE RAT) and a second RAT (e.g., a NR RAT). In some examples, the base station may be configured to support scheduling of sidelink resources for three or more RATs. Accordingly, the base station may broadcast a signal (e.g., in a system information block (SIB) message) that informs or otherwise indicates to the UEs within its coverage area that supports dual, or more, RAT sidelink scheduling. The base station may primarily support wireless communications with the UEs using the first RAT.

A UE may determine that it wants to perform sidelink communications using the second RAT or using both of the first RAT and the second RAT. Accordingly, the UE may transmit a sidelink information message to the base station that includes or otherwise conveys an indication that the UE wants to perform the sidelink communications using the second RAT or both of the first RAT and the second RAT. In some aspects, the sidelink information message may be transmitted to the base station using the first RAT. In some aspects, the sidelink information message may include additional information, such as whether the sidelink communications are for normal or high priority communications, a quality-of-service (QoS) indicator for the sidelink communications, a transmissions type indication, a service type indicator, and the like.

The base station may receive the sidelink information message and respond with a configuration message, e.g., using radio resource control (RRC) signaling, to the UE. In some aspects, the RRC signaling may provide configuration information to the UE, such as an identifier for the sidelink communications, an indication of available sidelink resources, and the like. The UE may respond by transmitting a request for resources to the base station. Generally, the resource request may include one or more buffer status reports (BSRs) that are configured based on whether the resource request is for sidelink resources using the second RAT or both of the first RAT and the second RAT. For example, a first BSR may be included in the resource request identifying information to be communicated using the first RAT and a second BSR may be included in the resource request identifying information to be communicated using the second RAT. In some aspects, the identifier received in a configuration message from the base station (e.g., the RRC signaling) may be included in the BSRs. Accordingly, the base station may respond by transmitting a scheduling grant for sidelink resources using the second RAT or using the first RAT and the second RAT (e.g., as is indicated in the resource request and the sidelink information message). The UE may use the sidelink resources from the scheduling grant to perform the sidelink communications with other UEs.

Aspects of the disclosure are further illustrated by and described with reference to apparatus diagrams, system diagrams, and flowcharts that relate to multi-RAT scheduling of sidelink interface.

FIG. 1 illustrates an example of a wireless communications system 100 that supports multi-RAT scheduling of a sidelink interface in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap. Overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may receive a message indicating that a base station 105 supports allocating resources for sidelink communications using a first RAT and a second RAT that is different from the first RAT. The UE 115 may transmit a sidelink information message to the base station 105 using the first RAT that indicates that sidelink communications are to be performed using either the second RAT or both the first RAT and the second RAT. The UE 115 may receive a configuration message from the base station 105 that comprises an identifier for the sidelink communications and an indication of available sidelink resources. The UE 115 may transmit, based at least in part on the configuration message, a request for resources within the available sidelink resources, the request indicating the identifier and a BSR configured based at least in part on whether the request for resources is associated with the second RAT or both the first RAT and the second RAT.

In some aspects, a base station 105 may receive a sidelink information message from a UE 115 using a first RAT indicating that sidelink communications are to be performed using a second RAT or both the first RAT and the second RAT. The base station 105 may transmit a configuration message to the UE 115 that comprises an identifier for the sidelink communications and an indication of available sidelink resources. The base station 105 may receive, based at least in part on the configuration message, a request for resources within the available sidelink resources, the request indicating the identifier and a BSR configured based at least in part on whether the request for resources is associated with the second RAT or both the first RAT and the second RAT.

Figure 2:
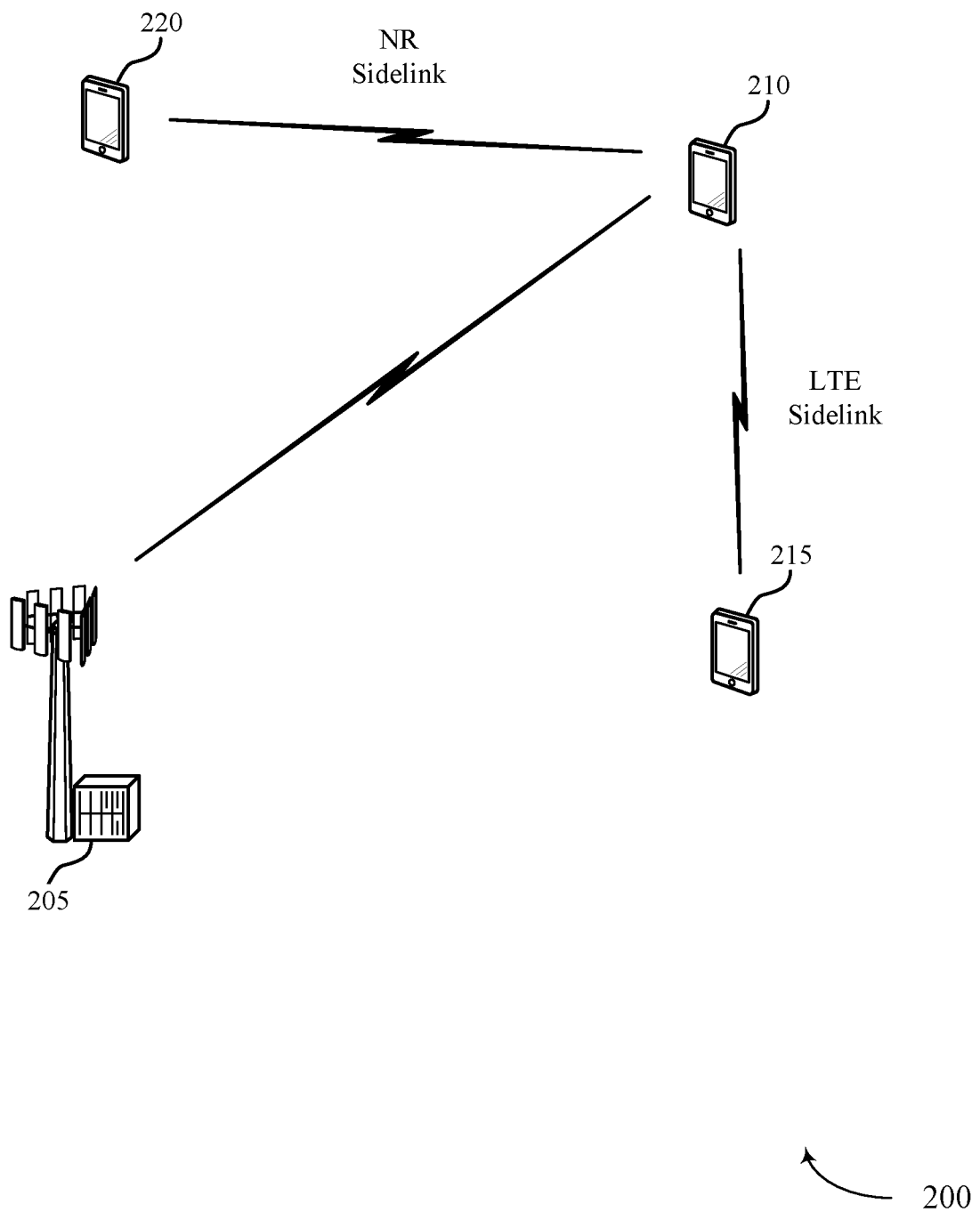
FIG. 2 illustrates an example of a wireless communication system that supports multi-RAT scheduling of sidelink interface in accordance with aspects of the present disclosure.

FIG. 2 illustrates an example of a wireless communication system 200 that supports multi-RAT scheduling of sidelink interface in accordance with aspects of the present disclosure. In some examples, wireless communication system 200 may implement aspects of wireless communication system 100. Wireless communication system 200 may include a base station 205, a UE 210, a UE 215, and a UE 220, which may be examples of the corresponding devices described herein.

Generally, wireless communications systems may be deployed in a variety of ways, which may be according to an associated RAT. For example, in one scenario, legacy base stations (such as LTE release 15 and the lower base stations) may be deployed adjacent to, but not overlapping, one or more next-generation base stations (such as a 3rd Generation Partnership Project (3GPP) release 16 and higher base stations, which may also be referred to as NR base stations). In this scenario, a UE may only be able to support sidelink communications using the RAT that is associated with the base station to which the UE is connected.

As another example, a scenario may include next generation base stations being deployed within the coverage area of a dual mode or a dual connectivity base station (such as base station 205). In this scenario, the next generation base stations may be generically considered LTE configured base stations that may not support NR Uu interface scheduling. The dual mode base station may support scheduling resources (e.g., such as sidelink resources) using more than one RAT. For example, the first RAT may refer to the legacy sidelink communication interface supported by an LTE base station (LTE PC5), for example an LTE release 15 and lower base station, and the second RAT may refer to a next-generation sidelink communication interface (NR PC5) which may be supported by an enhanced base station, such as a 3GPP release 16 and higher base station (e.g., a NR RAT base station). In some examples, the dual-mode base station may only be able to support sidelink communication (PC5) using the second RAT (e.g., scheduling NR PC5 resources), but may not support other communications included in the overall second RAT (e.g., a NR Uu interface). In this context, the dual mode base station (e.g., base station 205) may primarily communicate with UEs using the first RAT (e.g., using an LTE 3GPP release 16 or higher), but may also support scheduling sidelink resources for the UEs within its coverage area using the second RAT or using the first RAT and the second RAT. Generally, in this context the sidelink resources may be scheduled using or via the first RAT.

As another example, a scenario may include next-generation base stations being deployed, wherein one or more of the next-generation base stations (such as base station 205) are configured as dual mode base stations that primarily communicate using the second RAT, but also support scheduling sidelink resources using the first RAT and the second RAT. In this scenario, the next generation base stations (e.g., NR base stations) may again primarily communicate with UEs using the second RAT but may also support scheduling sidelink communications using the first RAT or using the first RAT and the second RAT.

Sidelink communications generally refer to direct communications between UEs, such as D2D communications, V2X communications, enhanced V2X (eV2X), and the like. Sidelink communications are typically performed via a PC5 interface that enables direct communications between the UEs. However, the protocols/configurations for the PC5 interface may be different for different RATs. For example, an LTE RAT may utilize a first set of protocols, configurations, and the like, in order to request and/or schedule sidelink resources for the LTE RAT PC5 interface. Similarly, a NR RAT may utilize a second set of protocols, configurations, and the like, in order to request and reschedule sidelink resources for the NR RAT PC5 interface.

Accordingly, wireless communication system 200 may support wireless communications using more than one RAT. For example, base station 205 and one or more of UEs 210, 215, and/or 220, may be configured to support wireless communications using a first RAT (such as an LTE RAT) and to support sidelink communications using a second RAT (such as a NR RAT, a mmW RAT, and the like). In some aspects, base station 205 may communicate with UEs 210, 215, and/or 220, using a first RAT (e.g., an LTE RAT) in order to schedule the sidelink resources for a second RAT (e.g., a NR RAT). That is, wireless communication system 200 may be primarily configured as a first RAT network but may support base station 205 scheduling sidelink resources for UEs (e.g., UE 210, UE 215, and/or UE 220) to use to perform sidelink communications using the second RAT or both of the first and second RATs.

In some aspects, base station 205 may advertise to the UEs within its coverage area (such as UEs 210, 215, and/or 220) that it supports scheduling sidelink resources using more than one RAT. For example, base station 205 may be an LTE eNB configured for scheduling both LTE PC5 and NR-PC5. In some examples, wireless communication system 200 may not include a gNB, UEs 210, 215, and/or 220 may be outside a coverage range of a gNB of system 200, UEs 210, 215, and/or 220 may not have established a connection with a gNB of system 200, or the like. In some aspects, base station 205 may broadcast a signal or message, such as in a SIB broadcast, that includes one or more bits, fields, and the like, that signals or otherwise conveys the indication that the base station 205 supports scheduling sidelink resources using the first RAT and the second RAT. In some examples, support for scheduling sidelink resources for the first RAT may be implicit (e.g., in that the base station 205 is primarily configured to communicate using the first RAT), whereas support for scheduling sidelink resources for the second RAT may be explicit (e.g., such as setting a bit, a field, etc.) to provide the indication. Accordingly, the UEs within the coverage area base station 205 may know ahead of time that base station 205 is available to schedule sidelink resources using more than one RAT.

In some aspects, a UE (such as UE 210 in this example) may determine to perform sidelink communications using one or more RATs. For example, UE 210 may determine to perform sidelink communications using a first RAT (e.g., an LTE RAT) with UE 215 and perform sidelink communications using a second RAT (e.g., an NR RAT) with UE 220. Accordingly, UE 210 may transmit a sidelink information message (e.g., a SideLinkUEInfo message) to base station 205 that includes or otherwise conveys an indication that sidelink communications are to be performed using the second RAT or both the first and second RATs.

In some aspects, the sidelink information message may utilize a bit, a flag, a field, and the like, to convey an indication that a resource request is for the second RAT (and the first RAT, if applicable). In some aspects, the bit, flag, field, and the like, may indicate that a resource request is for a NR or LTE carrier from a frequency list (e.g., a sidelink V2X communication frequency list (SL-V2X-CommFreqList) or a sidelink V2X communication transmission frequency list (SL-V2X-CommTxFreqList)). In some aspects, the sidelink information message may include or otherwise provide an indication of a preferred transmission type or radio resource type for the sidelink communications, e.g., such as whether the sidelink communications are for a normal TTI, an ultra-reliable/low-latency communications (URLLC), or both. In some aspects, the sidelink information message may include or otherwise provide an indication of a QoS requirement for the sidelink communications, e.g., such as a fifth generation (5G) quality indicator (5QI) requirement. In some aspects, the sidelink information message may include or otherwise convey an indication of a service type for the sidelink communications, e.g., such as a provider service identifier (PSID), an intelligent transport systems application identifier (ITS-AID) message type indication, and the like. Base station 205 may use information provided in the indication of the transmission type and the service type to ensure that appropriate sidelink resources are allocated to UE 210.

In some aspects, base station 205 may respond by transmitting a configuration message to UE 210 that includes or otherwise provides an indication of an identifier for the sidelink communications. For example, the configuration message may include an identifier for different transmission types, such as a NR-V2X-RNTI for a normal TTI transmission type and a NR-V2X-URLLC-RNTI for an URLLC transmission type. As another example, the configuration message may include an identifier associated with the RAT that the sidelink communications are to be performed on, e.g., such as a first identifier for the first RAT and the second identifier for the second RAT.

In some examples, the configuration message may also include or otherwise provide an indication of a resource pool (e.g., such as lists of available sidelink resources). For example, the configuration message may provide an indication of shared or dedicated sidelink resources for the second RAT (e.g., in a resource pool format). For example, the shared or dedicated sidelink resources may be shared or dedicated NR V2X pools in a NR pool format. In some aspects, the configuration message may be communicated in RRC signaling or message (such as an RRCConnectionReconfiguration message). In some aspects, the configuration message may additionally include or otherwise provide an indication of a mapping assignment. The mapping assignment may map one or more logical channels (e.g., per LCID) to the first RAT or the second RAT. In some aspects, the mapping assignment may map the logical channel to a transmission type, e.g., a first LCID mapped to a normal TTI transmission type and a second LCID mapped to a URLLC transmission type. UE 210 may use the mapping assignment in configuring the BSR(s) for the second RAT.

In some aspects, UE 210 may respond by requesting sidelink resources from base station 205. For example, UE 210 may transmit to base station 205 a request for resources within the available sidelink resources indicated in the configuration message. The resource request may include or otherwise provide an indication of the identifier that was provided in the configuration message (e.g., a RNTI received in an RRCConnectionReconfiguration message). In some aspects, the resource request may include one or more BSRs. For example, each of the one or more BSRs may be configured based on whether the requested resources are associated with the second RAT or are associated with the first RAT and the second RAT. In some aspects, a BSR may be included for each identifier indicated in the configuration message, for each transmission type being communicated during the sidelink communications, and the like. In some aspects, the resource request may be communicated as a MAC control element (CE) in an uplink communication from UE 210 to base station 205.

In some aspects, the resource request may include a BSR configured for the first RAT (e.g., a legacy LTE BSR) if the resource request is for sidelink resources for the first RAT (e.g., an LTE-PC5 resource). In some aspects, the resource request may include an enhanced BSR if the resource request is for sidelink resources for the second RAT (e.g., for an NR-V2X resource or for a NR-V2X plus an LTE-PC5 resource). In some aspects, this may include UE 210 reusing a destination index mapping (e.g., the LCID mapping) and/or indicating a service type, such as PSID or ITS-AID. In some aspects, the resource request may include the service type indicator, such as PSID and/or ITS-AID, and/or the transmission type indication, such as for a normal TTI transmission type and/or a URLLC transmission type, that were indicated in the sidelink information message.

In some aspects, base station 205 may respond to the resource request with the scheduling grant of sidelink resources. For example, base station 205 may generate a resource grant that allocates resources within the available sidelink resources, and scramble resource grant using the identifier indicated in the configuration message. This may create a scrambled resource grant that is then transmitted in a DCI of a control channel to UE 210. In some aspects, UE 210 may receive the DCI in the control channel and descramble the DCI using the identifier. UE 210 may obtain the resource grant that allocates the resources and then use those resources to perform the sidelink communications.

In some examples, multiple resource grants may be provided by base station 205. For example, a resource grant may be provided for each identifier that was indicated in the configuration message. In the case where two identifiers were indicated, base station 205 may generate separate resource grants for each identifier. Base station 205 may scramble each resource grant using its associated identifier, e.g., scramble a first resource grant using the first identifier and scramble a second resource grant using a second identifier). In some examples, each identifier may be associated with a different RAT, e.g., a first identifier associated with sidelink communications using the first RAT and a second identifier associated with sidelink communications using the second RAT. In some aspects, each identifier may be associated with different transmission types within the second RAT, e.g., such as a first identifier associated with the first transmission type for the second RAT (e.g., NR-V2X-RNTI) and the second identifier associated with a second transmission type for the second RAT (e.g., NR-V2X-URLLC-RNTI). Accordingly, base station 205 may provide sidelink resource grants corresponding to the identifiers indicated in the configuration message.

In some aspects, UE 210 may use the allocated sidelink resources to perform sidelink communications with UE 215 via the first RAT (e.g., the LTE RAT) and to perform sidelink communications with UE 220 via the second RAT (e.g., the NR RAT).

Figure 3:
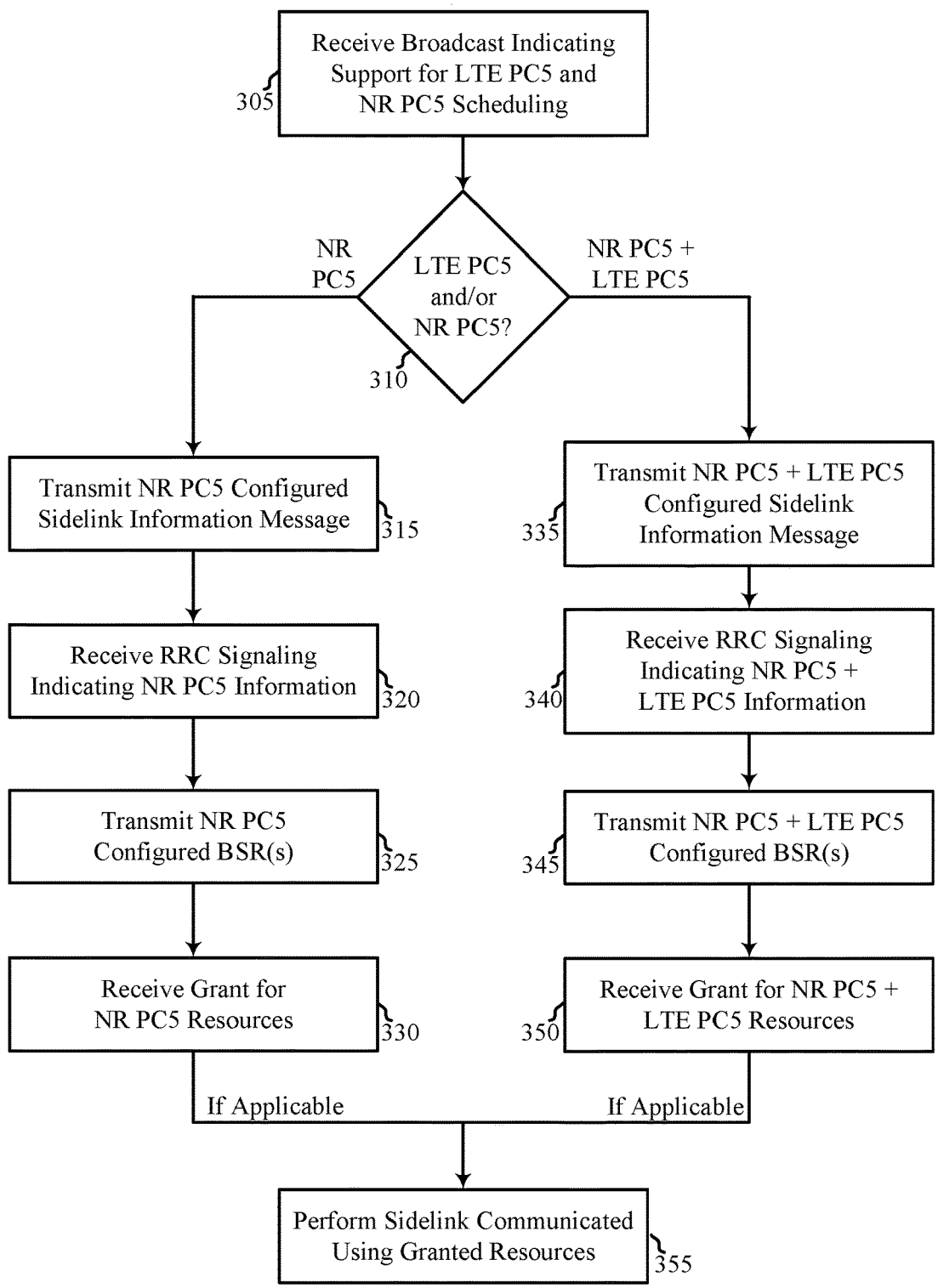
FIG. 3 illustrates an example of a flowchart that supports multi-RAT scheduling of sidelink interface in accordance with aspects of the present disclosure.

FIG. 3 illustrates an example of a flowchart 300 that supports multi-RAT scheduling of sidelink interface in accordance with aspects of the present disclosure. In some examples, flowchart 300 may implement aspects of wireless communication systems 100/200. Aspects of flowchart 300 may be implemented by a UE, which may be an example of the corresponding device described herein.

At 305, the UE may receive a broadcast signal indicating support by a base station for LTE PC5 and NR PC5 scheduling, e.g., support for sidelink resource scheduling for LTE and NR RATs. In this example, the LTE PC5 interface may refer to a first RAT and the NR PC5 interface may refer to a second RAT. Generally, a PC5 interface has an associated, for each RAT, set of protocols, configurations, and the like, for the sidelink communications between UEs. The broadcast signal may be received in a system information block message, in a synchronization signal message, and the like.

At 310, the UE may determine whether it wants to perform sidelink communications using the second RAT or the second RAT and the first RAT. As one example, the UE may be configured generally to support the first RAT for wireless communications, but also configured to support the second RAT, e.g., to support sidelink communications using the second RAT. Accordingly, the UE may determine that it wants to perform sidelink communications with the first UE that supports sidelink communications using the second RAT. As another example, the UE may determine that it wants to perform sidelink communications with a first UE that is configured to support the first RAT and a second UE that is configured to support the second RAT.

In some aspects, the determination of whether and how the UE requests sidelink resources may depend upon whether the UE wishes to perform sidelink communications using just the second RAT or using the second RAT and the first RAT.

In the situation where the UE is only requesting sidelink resources for the second RAT, at 315 the UE may transmit a sidelink information message to the base station using the first RAT, but that provides an indication that the sidelink communications are to be performed using the second RAT. In some aspects, the sidelink information message may further include or otherwise provide an indication of a transmission type (e.g., normal TTI, URLLC, etc.), a traffic profile, a QoS indicator, a service type indicator, and the like, for the sidelink communications using the second RAT. Generally, the transmission type may correspond to a desired latency and type of resource allocation for the sidelink communications, e.g., a normal TTI resource allocation versus a URLLC resource allocation, a mission critical (MiCR) resource allocation versus a non-MiCR resource allocation, etc. Generally, the traffic profile may refer to the type of traffic that is being communicated using the sidelink communications, e.g., IP traffic versus voice traffic, control traffic versus data traffic, etc. Generally, the QoS indicator may refer to any quality metric associated with the sidelink communications, e.g., a latency requirement, a reliability requirement, etc. The service type indicator may identify the services to be carried in the sidelink communications (e.g., PSID or ITS-AID).

At 320, the UE may receive a configuration message from the base station that includes or otherwise conveys an indication of an identifier for the sidelink communications using the second RAT. In some examples, the configuration message may be an RRC message that also includes or otherwise provides an indication of some available sidelink resources. In some aspects, the configuration message may include one or more bits, fields, flags, and the like, that are configured according to protocols associated with the second RAT.

At 325, the UE may transmit a request for resources to the base station to use to perform the sidelink communications using the second RAT. For example, the resource request may include or otherwise convey an indication of the identifier signaled in the configuration message and one or more BSRs that are configured based on the resource request being for resources associated with the second RAT.

At 330, the UE may receive a grant for sidelink resources to use to perform the sidelink communications using the second RAT. In some aspects, the UE may receive a DCI in a control channel and descramble the DCI using the identifier to recover the resource grant. In some examples, the identifier is associated with two identifiers, e.g., a first identifier and a second identifier, that are both associated with the second RAT. For example, the two identifiers may be provided in a situation where different transmission types are being performed in the sidelink communications using the second RAT. For example, the base station may transmit the grant in an enhanced PDCCH ((e)PDCCH) with a DCI scrambled with NR-v2X-RNTI and/or NR-V2X-URLLC-RNTI depending upon whether resources are assigned for a first transmission type of the second RAT, a second transmission type of the second RAT, or both. Accordingly, the UE may use the first identifier to descramble the DCI to recover the resource grant for the first transmission type and use the second identifier to descramble the DCI to recover the resource grant for the second transmission type.

In the situation where the UE is requesting sidelink resources for both the second RAT and the first RAT, at 355 the UE may transmit a sidelink information message to the base station using the first RAT, but that provides an indication that the sidelink communications are to be performed using the second RAT and the first RAT. In some aspects, the sidelink information message may further include or otherwise provide an indication of a transmission type (e.g., indicating one or more of normal TTI, URLLC, MiCR, non-MiCR, etc., corresponding to a desired latency and type of resource allocation), a traffic profile, a quality of service indicator, a service type indicator, and the like, for the sidelink communications using the second RAT and/or the first RAT.

At 340, the UE may receive a configuration message from the base station that includes or otherwise conveys an indication of an identifier for the sidelink communications using the second RAT and the first RAT. In some examples, the configuration message may be an RRC message that also includes or otherwise provides an indication of some available sidelink resources. In some aspects, the configuration message may include one or more bits, fields, flags, and the like, that are configured according to protocols associated with the first RAT and the second RAT.

At 345, the UE may transmit a request for resources to the base station to use to perform the sidelink communications using the second RAT and the first RAT. For example, the resource request may include or otherwise convey an indication of the identifier signaled in the configuration message and one or more BSRs that are configured based on the resource request being for resources associated with the second RAT and the first RAT.

At 350, the UE may receive a grant for sidelink resources to use to perform the sidelink communications using the second RAT and the first RAT. In some aspects, the UE may receive a DCI in a control channel and descramble the DCI using the identifier to recover the resource grant. In some examples, the identifier is associated with two identifiers, e.g., a first identifier and a second identifier, where each identifier is associated with a different RAT. Accordingly, the UE may use the first identifier to descramble the DCI to recover the resource grant for the first RAT and use the second identifier to descramble the DCI to recover the resource grant for the second RAT. In some aspects, multiple identifiers are provided in the RRC signaling, where some identifiers are associated with different RATs and other identifiers are associated with different transmission types.

Accordingly, and as applicable, at 355 the UE may perform the sidelink communications using the granted resources. In the example where the sidelink communications use the second RAT, the UE may perform the sidelink communications with another UE using the second RAT using the allocated resources. In the example where the sidelink communications use the first RAT and the second RAT, the UE may perform the sidelink communications with one or more UEs using the first RAT and the second RAT using the allocated resources, respectively.

Figure 4:
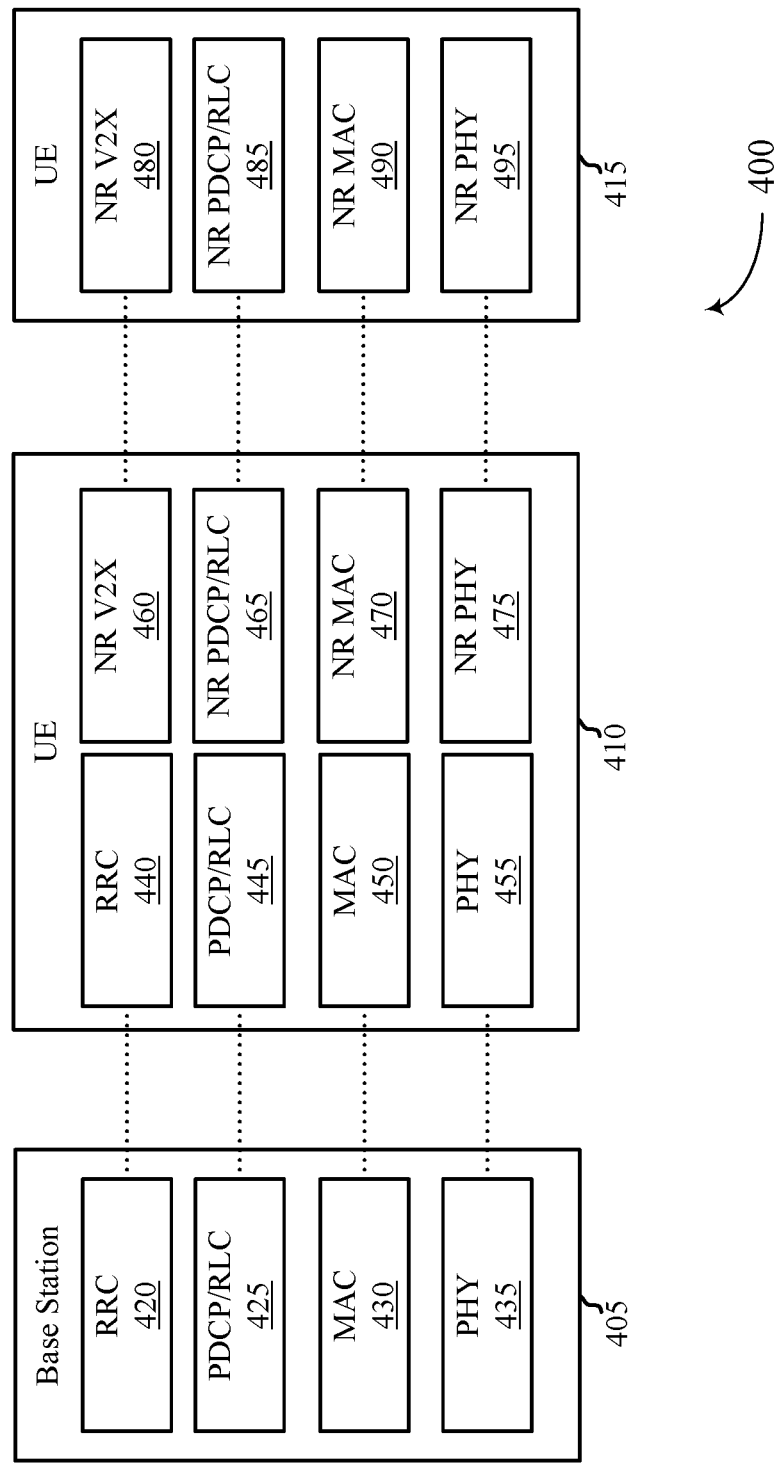
FIG. 4 illustrates an example of protocol stack configurations that supports multi-RAT scheduling of sidelink interface in accordance with aspects of the present disclosure.

FIG. 4 illustrates an example of protocol stack configurations 400 that supports multi-RAT scheduling of sidelink interface in accordance with aspects of the present disclosure. In some examples, protocol stack configurations 400 may be implemented by a base station 405, a UE 410, and a UE 415, which may be examples of the corresponding devices described herein.

Generally, protocol stack configurations 400 support base station 405 providing scheduling grant for sidelink resources using multiple RATs. Base station 405 may include an RRC protocol layer 420, a PDCP/RLC layer 425, a MAC layer 430, and a PHY layer 435. Generally, the protocol stack configuration of base station 205 may refer to a layered protocol stack. In the user plane, communications at the bearer or PDCP layer may be IP-based and the RLC layer may in some cases perform packet segmentation and reassembly to communicate over logical channels. MAC layer 430 may perform priority handling and multiplexing of logical channels into transport channels. MAC layer 430 may also use HARQ to provide retransmission at MAC layer 430 to improve link efficiency. In the control plane, RRC protocol layer 420 may provide establishment, configuration, and maintenance of an RRC connection between a UE and a base station or core network supporting radio bearers for user plane data. At PHY layer 435, transport channels may be mapped to physical channels. Generally, the protocol stack configuration for a base station 405 may support communications using a first RAT (e.g., an LTE RAT) and a second RAT (e.g., a NR RAT).

Generally, the protocol stack configuration for base station 405 may provide connectivity between base station 405 and an EPC, e.g., manage or otherwise provide communications over an S1 interface between base station 405 and the EPC. Moreover, the protocol stack configuration for base station 405 may also manage one or more aspects of supporting sidelink scheduling using a NR PC5 interface for UEs within the coverage area of base station 405. For example, one or more layers of the protocol stack configuration of base station 405 may indicate whether the nearby gNBs exists and/or whether base station 405 supports NR V2X sidelink scheduling. The UEs within the coverage area may detect whether base station 405 supports NR PC5 scheduling, and, if not, can place the NR V2X operation in a non-use mode. Otherwise, the UE can use mode 3 scheduling of sidelink resources. In other scenarios, the UE may detect the existence of gNB that does not support NR V2X sidelink scheduling.

UE 410 may include an RRC protocol layer 440, a PDCP/RLC layer 445, a MAC layer 450, and a physical layer 455. Generally, each of these layers of UE 410 may perform similar functions as the corresponding layers of base station 405. For example, MAC layer 450 of UE 410 may communicate at the layer level with MAC layer 430 of base station 405 to perform priority handling and multiplexing of logical channels into transport channels between the corresponding devices. As another example, RRC protocol layer 440 of UE 410 may communicate at the layer level with RRC protocol layer 420 of base station 405 to provide establishment, configuration, and maintenance of an RRC connection between UE 410 and base station 405.

UE 410 may also be configured to support sidelink communications using the second RAT. Accordingly, UE 410 may also include an NR V2X layer 460, and NR PDCP/RLC layer 465, a NR MAC layer 470, and a NR PHY layer 475. Generally, each of these layers of UE 410 may perform, for the second RAT, functions similar to those the corresponding layers perform for the first RAT. For example, NR V2X layer 460 may provide for establishment, configuration maintenance of an RRC connection between UE 410 and UE 415 during sidelink communications. As another example, NR PHY layer 475 may map transport channels to physical channels according to the second RAT for UE 410.

Similarly, UE 415 may also be configured to support sidelink communications using the second RAT. Accordingly, UE 415 may also include an NR V2X layer 480, a NR PDCP/RLC layer 485, a NR MAC layer 490, and a NR physical layer 495. Each of these layers of UE 415 may communicate at the layer level with their corresponding layers of UE 410. UE 415 may also optionally be equipped with protocol layers supporting communications using the first RAT.

Accordingly, the protocol stack configurations for a base station 405, UE 410, and UE 415 may support aspects of the described techniques where UE 410 determines that base station 405 supports allocating resources for sidelink communications using a first RAT and a second RAT. The layers may support UE 410 transmitting a sidelink information message to base station 405 using the first RAT that indicates that sidelink communications are to be performed using either the second RAT or both the first RAT and a second RAT. The layers may support UE 410 receiving a configuration message from base station 405 that comprises an identifier for the sidelink communications and an indication of available sidelink resources. The layers may support UE 410 transmitting, based at least on some aspects on the configuration message, a request for resources within the available sidelink resources to base station 405. The request may include or otherwise provide an indication of the identifier and a BSR that is configured based on whether the request for resources is for resources using the second RAT or for resources using the first RAT and the second RAT.

Figure 5:
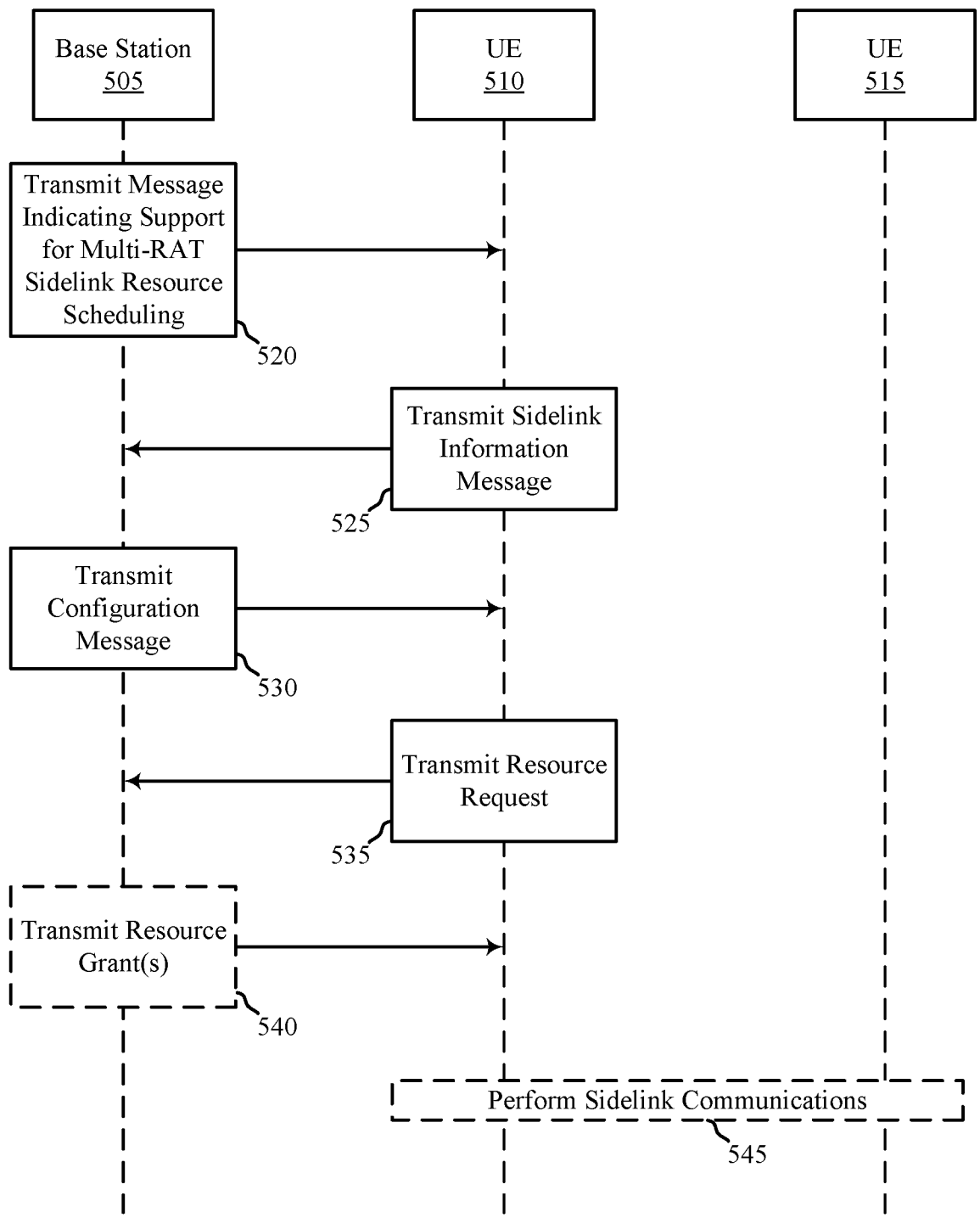
FIG. 5 illustrates an example of a process that supports multi-RAT scheduling of sidelink interface in accordance with aspects of the present disclosure.

FIG. 5 illustrates an example of a process 500 that supports multi-RAT scheduling of sidelink interface in accordance with aspects of the present disclosure. In some examples, process 500 may implement aspects of wireless communication systems 100/200, flowchart 300, and/or protocol stack configurations 400. Process 500 may include a base station 505, a UE 510, and a UE 515, which may be examples of the corresponding devices described herein.

At 520, base station 505 may transmit (and UE 510 may receive) a message that indicates that base station 505 supports allocating resources for sidelink communications using a first RAT and a second RAT. Generally, the first RAT is different from the second RAT, e.g., the first RAT may be an LTE RAT and the second RAT may be a NR RAT. The message may be broadcast, such as in a SIB broadcast, a synchronization signal (SS) broadcast, and the like.

At 525, UE 510 may transmit (and base station 505 may receive) a sidelink information message using the first RAT that indicates that sidelink communications are to be performed using either the second RAT or both the first RAT and the second RAT. In some aspects, the sidelink information message may include additional information associated with the sidelink communications, such as a transmission type (e.g., indicating one or more of normal TTI, URLLC, MiCR, non-MiCR, etc., corresponding to a desired latency and type of resource allocation), a traffic profile, a QoS indicator, a service type indicator, and the like.

At 530, base station 505 may transmit (and UE 510 may receive) a configuration message that includes or otherwise provides an indication of an identifier for the sidelink communications and/or an indication of available sidelink resources. In some aspects, the identifier may include more than one identifier, e.g., a first identifier and a second identifier, wherein each identifier is associated with a particular RAT, a particular transmission type, and the like. Examples of identifiers may include, but are not limited to an LCID, a RNTI, and the like.

At 535, UE 510 may transmit (and base station 505 may receive) a request for resources within the available sidelink resources. In some aspects the resource request is based at least in part on the configuration message. In some aspects, the resource request may include other or otherwise provide an indication of the identifier and/or a BSR that is configured based at least in part on whether the resource request is associated with the second RAT or both first RAT and the second RAT. In some aspects, the resource request may include a first BSR associated with the first RAT and a second BSR associated with the second RAT. In some aspects, the resource request may include a first BSR associated with a first transmission type using the second RAT and a second BSR associated with a second transmission type that also uses the second RAT. In some aspects, the BSR may include or otherwise provide an indication of a buffer status for the first RAT and a buffer status for the second RAT. The buffer statuses indicated in the BSR may refer to an amount of data stored in the corresponding buffer, an indication of an amount of resources needed to transmit the data stored in the corresponding buffer, and the like.

At 540, base station 505 may optionally transmit (and UE 510 may optionally receive) a resource grant allocating resources for UE 510 to use to perform the sidelink communications. In some aspects, this may include base station 505 generating a resource grant that allocates resources within the available sidelink resources and scrambling the resource grant using the identifier to generate a scrambled resource grant. Base station 505 may transmit a DCI in a control channel (e.g., a PDCCH) that includes or otherwise provides an indication of the scrambled resource grant. Accordingly, UE 510 may receive the DCI in the control channel and use the identifier to descramble the DCI to obtain the resource grant allocating the resources. In some aspects, the indication of the resource grant is not provided in a DCI scrambled with the identifier but is included in the payload data in the control signal (e.g., indicated as explicit signaling in the PDCCH signal).

In some aspects where the identifier includes multiple identifiers, with each identifier associated with a different RAT, this may include UE 510 using the first identifier associated with the first RAT to descramble the DCI to recover the resource grant allocating resources to the first RAT and then using the second identifier associated with the second RAT to descramble the DCI to recover resource grant allocating resources to the second RAT.

In some aspects where the identifier includes multiple identifiers, with each identifier associated with a different transmission type, this may include UE 510 using the first identifier to descramble the DCI to determine whether the DCI includes a resource grant allocating resources to the second RAT associated with a first transmission type (e.g., normal TTI) and then using a second identifier to descramble the DCI to determine whether the DCI includes a resource grant allocating resources to the second RAT associated with a second transmission type (e.g., URLLC).

At 545, UE 510 may optionally use the allocated resources to perform the sidelink communications with UE 515. In the example where the resources are allocated for sidelink communications using the first RAT and the second RAT, UE 510 may to perform the sidelink communications with UE 515 using the resources allocated for both the first RAT and the second RAT, or may perform sidelink communications with UE 515 using the resources allocated for the first RAT and then using the resources allocated for the second RAT to perform sidelink communications with a different UE.

Figure 6:
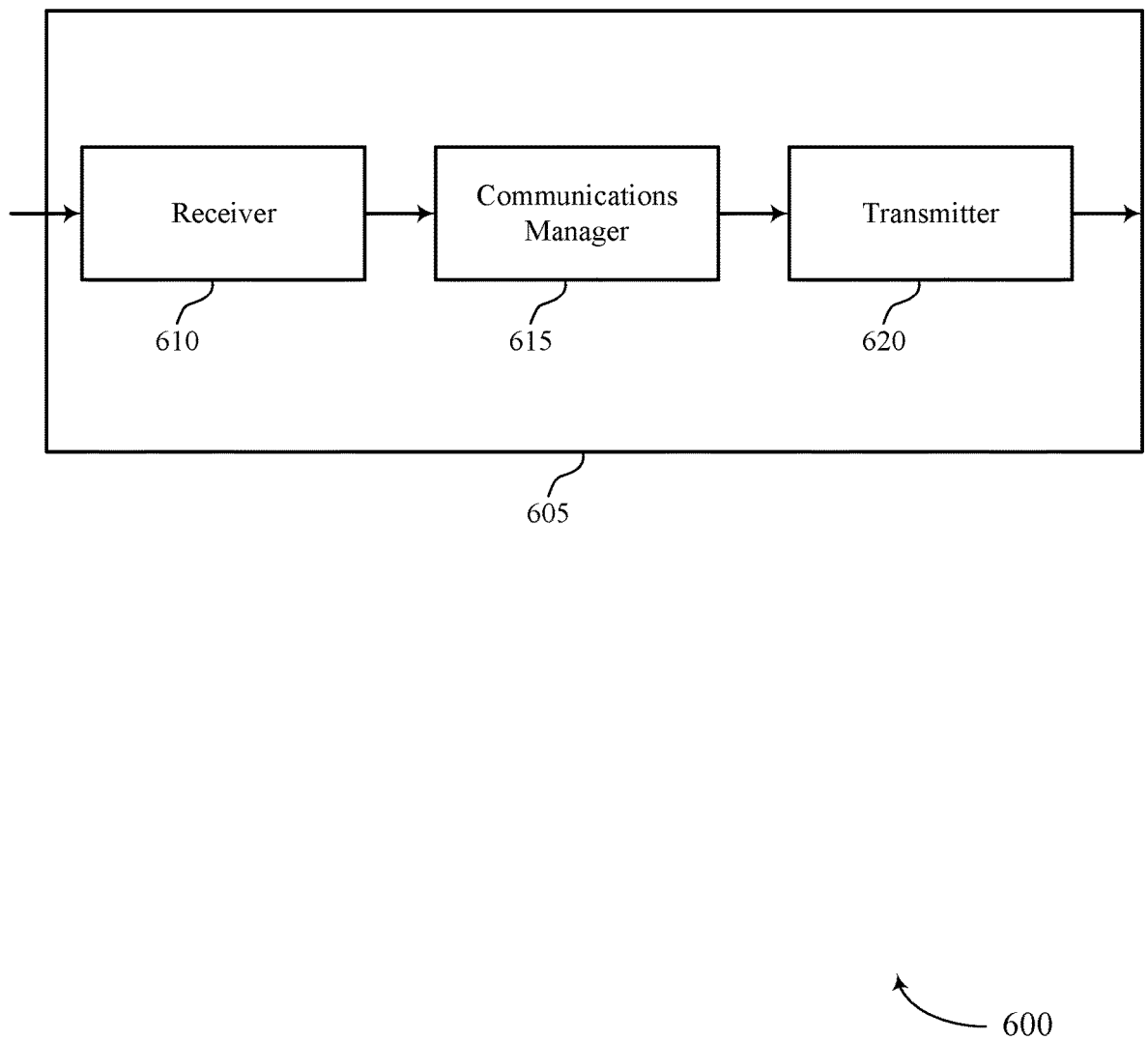
FIGS. 6 and 7 show block diagrams of devices that supports multi-RAT scheduling of sidelink interface in accordance with aspects of the present disclosure.

FIG. 6 shows a block diagram 600 of a UE 605 that supports multi-RAT scheduling of sidelink interface in accordance with aspects of the present disclosure. UE 605 may be an example of aspects of a UE 115 as described herein. UE 605 may include a receiver 610, a communications manager 615, and a transmitter 620. UE 605 may also include a processor. Each of these components may be in communication with one another (e.g., via one or more buses).

Receiver 610 may receive information such as packets, user data, or control information associated with various information channels (e.g., control channels, data channels, and information related to multi-RAT scheduling of sidelink interface, etc.). Information may be passed on to other components of the device. Receiver 610 may be an example of aspects of a transceiver 920 described with reference to FIG. 9. Receiver 610 may utilize a single antenna or a set of antennas.

Communications manager 615 may receive a message indicating that a base station supports allocating resources for sidelink communications using a first RAT and a second RAT that is different from the first RAT. Communications manager 615 may transmit a sidelink information message to the base station using the first RAT that indicates that sidelink communications are to be performed using either the second RAT or both the first RAT and the second RAT. Communications manager 615 may receive a configuration message from the base station that includes an identifier for the sidelink communications and an indication of available sidelink resources. Communications manager 615 may transmit, based on the configuration message, a request for resources within the available sidelink resources, the request indicating the identifier and a BSR configured based on whether the request for resources is associated with the second RAT or both the first RAT and the second RAT. Communications manager 615 may be an example of aspects of the communications manager 910 described with reference to FIG. 9.

Communications manager 615 or its sub-components, may be implemented in hardware, code (e.g., software or firmware) executed by a processor, or any combination thereof. If implemented in code executed by a processor, the functions of the communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

Communications manager 615 or its sub-components, may be physically located at various positions, including being distributed such that portions of functions are implemented at different physical locations by one or more physical devices. In some examples, communications manager 615 or its sub-components may be a separate and distinct component in accordance with various aspects of the present disclosure. In some examples, communications manager 615 or its sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of UE 605. In some examples, transmitter 620 may be collocated with a receiver 610 in a transceiver module. For example, transmitter 620 may be an example of aspects of transceiver 920 described with reference to FIG. 9. Transmitter 620 may utilize a single antenna or a set of antennas.

Figure 7:
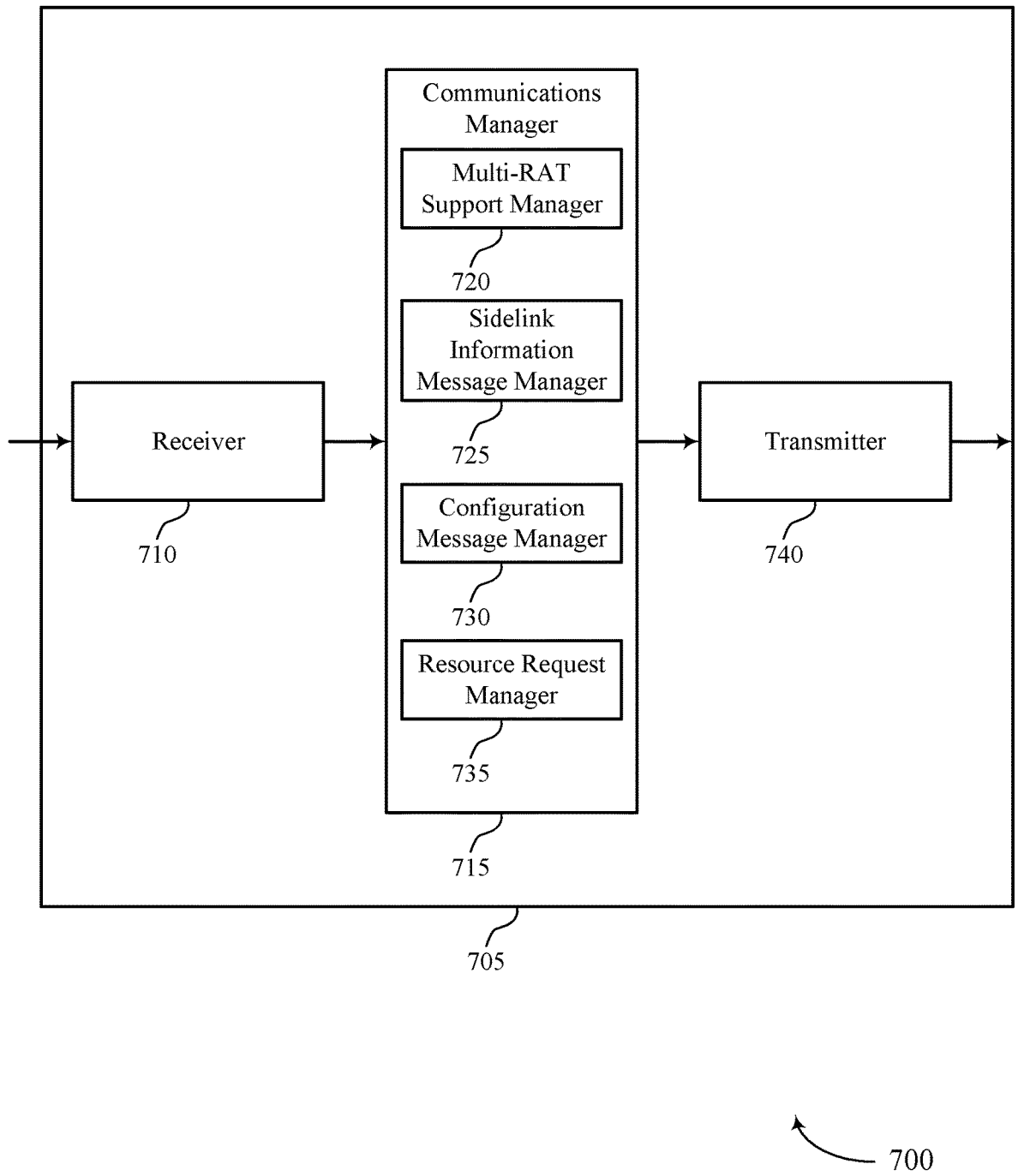

FIG. 7 shows a block diagram 700 of a device 705 that supports multi-RAT scheduling of sidelink interface in accordance with aspects of the present disclosure. Device 705 may be an example of aspects of a UE 605 or a UE 115 as described with reference to FIGS. 1 and 6. Device 705 may include a receiver 710, a communications manager 715, and a transmitter 740. Device 705 may also include a processor. Each of these components may be in communication with one another (e.g., via one or more buses).

Receiver 710 may receive information such as packets, user data, or control information associated with various information channels (e.g., control channels, data channels, and information related to multi-RAT scheduling of sidelink interface, etc.). Information may be passed on to other components of the device. Receiver 710 may be an example of aspects of transceiver 920 described with reference to FIG. 9. Receiver 710 may utilize a single antenna or a set of antennas.

Communications manager 715 may also include a multi-RAT support manager 720, a sidelink information message manager 725, a configuration message manager 730, and a resource request manager 735. Communications manager 715 may be an example of aspects of communications manager 910 described with reference to FIG. 9.

Multi-RAT support manager 720 may receive a message indicating that a base station supports allocating resources for sidelink communications using a first RAT and a second RAT that is different from the first RAT.

Sidelink information message manager 725 may transmit a sidelink information message to the base station using the first RAT that indicates that sidelink communications are to be performed using either the second RAT or both the first RAT and the second RAT.

Configuration message manager 730 may receive a configuration message from the base station that includes an identifier for the sidelink communications and an indication of available sidelink resources.

Resource request manager 735 may transmit, based on the configuration message, a request for resources within the available sidelink resources, the request indicating the identifier and a BSR configured based on whether the request for resources is associated with the second RAT or both the first RAT and the second RAT.

Transmitter 740 may transmit signals generated by other components of device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
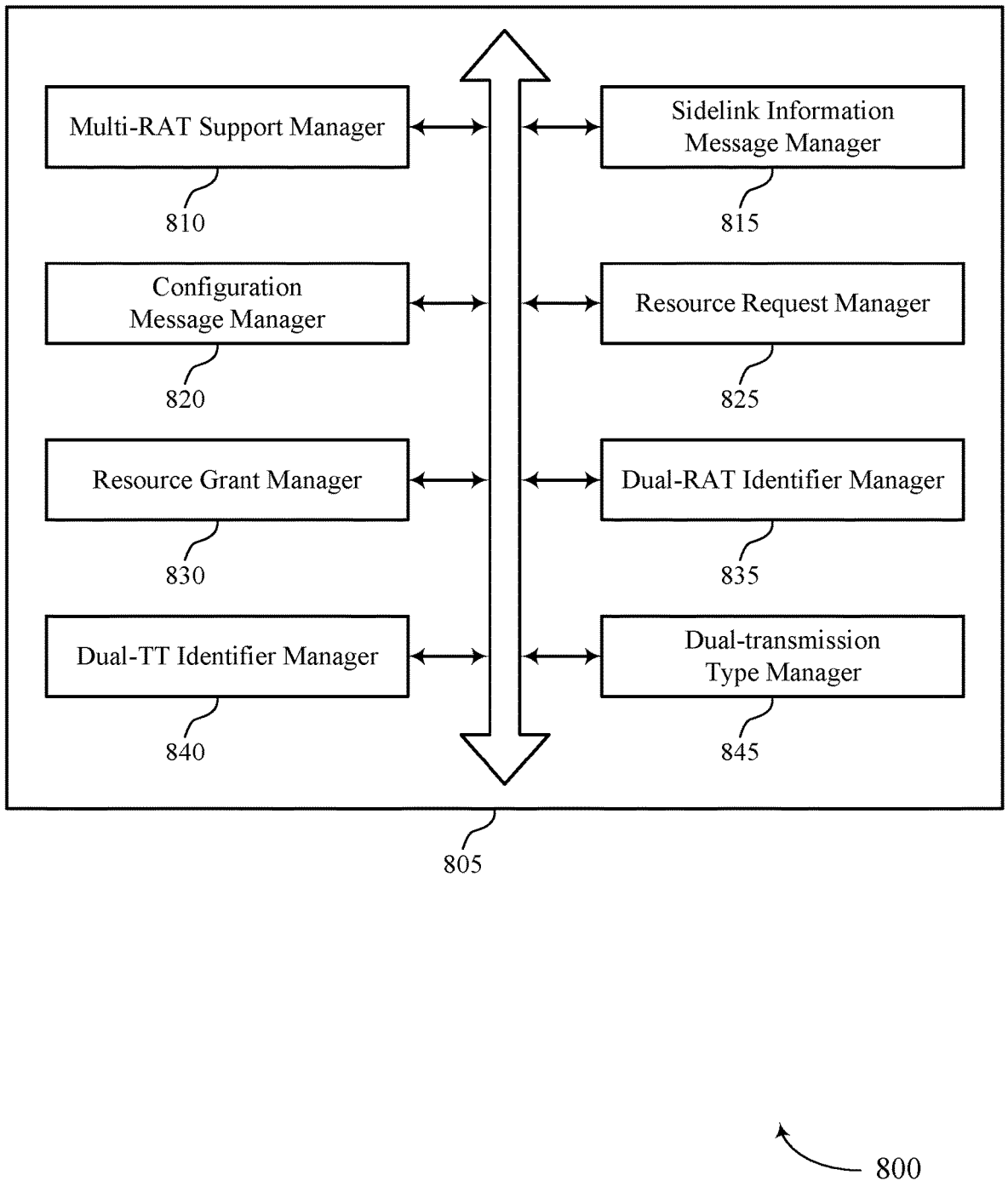
FIG. 8 show a block diagram of a device that supports multi-RAT scheduling of sidelink interface in accordance with aspects of the present disclosure.

FIG. 8 shows a block diagram 800 of a communications manager 805 that supports multi-RAT scheduling of sidelink interface in accordance with aspects of the present disclosure. Communications manager 815 may be an example of aspects of a communications manager 615, a communications manager 715, or a communications manager 910 described with reference to FIGS. 6, 7, and 9. Communications manager 815 may include a multi-RAT support manager 810, a sidelink information message manager 815, a configuration message manager 820, a resource request manager 825, a resource grant manager 830, a dual-RAT identifier manager 835, a dual-TT identifier manager 840, and a dual-transmission type manager 845. Each of these modules may communicate, directly or indirectly, with one another (e.g., via one or more buses).

Multi-RAT support manager 810 may receive a message indicating that a base station supports allocating resources for sidelink communications using a first RAT and a second RAT that is different from the first RAT. In some cases, the message is a SIB message that is broadcast by the base station. In some cases, the first RAT is an LTE RAT and the second RAT is an NR RAT.

Sidelink information message manager 815 may transmit a sidelink information message to the base station using the first RAT that indicates that sidelink communications are to be performed using either the second RAT or both the first RAT and the second RAT. In some cases, the sidelink information message indicates a transmission type (e.g., indicating one or more of normal TTI, URLLC, MiCR, non-MiCR, etc., corresponding to a desired latency and type of resource allocation), a traffic profile, a quality of service indicator, a service type indicator, or any combination thereof, for the sidelink communications.

Configuration message manager 820 may receive a configuration message from the base station that includes an identifier for the sidelink communications and an indication of available sidelink resources. In some cases, the configuration message indicates a mapping assignment for a logical channel associated with the first RAT or the second RAT. In some cases, the identifier is at least one of a LCID or a RNTI. In some cases, the configuration message is an RRC message.

Resource request manager 825 may transmit, based on the configuration message, a request for resources within the available sidelink resources, the request indicating the identifier and a BSR configured based on whether the request for resources is associated with the second RAT or both the first RAT and the second RAT. In some cases, the BSR indicates a buffer status for the first RAT and a buffer status for the second RAT.

Resource grant manager 830 may receive DCI in a control channel. In some examples, resource grant manager 830 may descramble the DCI using the identifier to obtain a resource grant allocating resources within the available sidelink resources. In some examples, resource grant manager 830 may perform the sidelink communications using the allocated resources.

Dual-RAT identifier manager 835 may receive DCI in a control channel. In some examples, dual-RAT identifier manager 835 may descramble the DCI using the first identifier for determining whether the DCI includes a resource grant allocating resources to the first RAT. In some examples, dual-RAT identifier manager 835 may descramble the DCI using the second identifier for determining whether the DCI includes a resource grant allocating resources to the second RAT. In some cases, the identifier includes a first identifier associated with the first RAT and a second identifier associated with the second RAT.

Dual-TT identifier manager 840 may monitor, control, or otherwise manage one or more aspects of the identifier including a first identifier associated with the second RAT and a second identifier associated with the second RAT.

Dual-transmission type manager 845 may receive DCI in a control channel. In some examples, dual-transmission type manager 845 may descramble the DCI using the first identifier for determining whether the DCI includes a resource grant allocating resources to the second RAT associated with a first transmission type. In some examples, dual-transmission type manager 845 may descramble the DCI using the second identifier for determining whether the DCI includes a resource grant allocating resources to the second RAT associated with a second transmission type.

Figure 9:
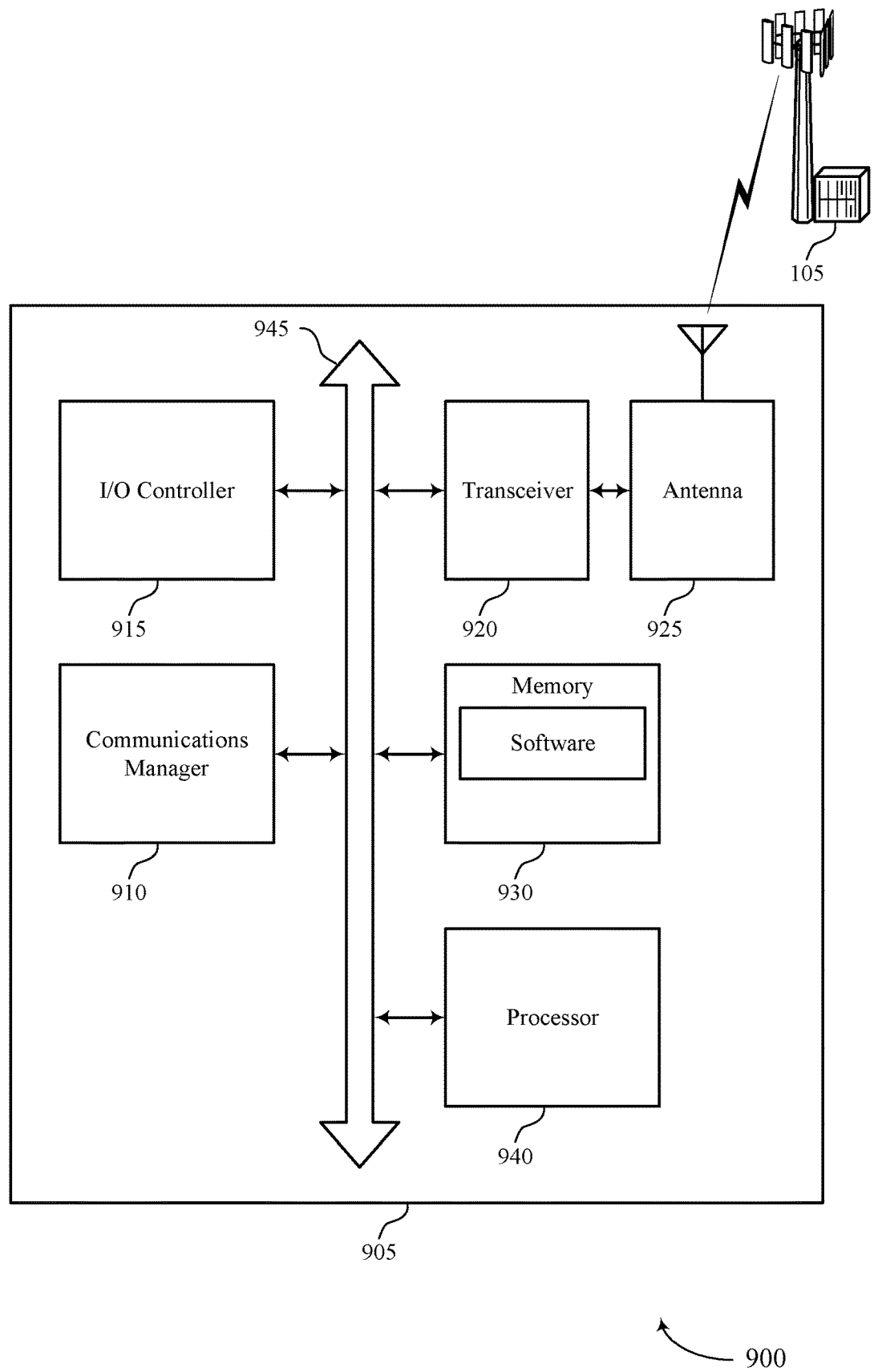
FIG. 9 illustrates a block diagram of a system including a user equipment (UE) that supports multi-RAT scheduling of sidelink interface in accordance with aspects of the present disclosure.

FIG. 9 shows a diagram of a system 900 including a device 905 that supports multi-RAT scheduling of sidelink interface in accordance with aspects of the present disclosure. Device 905 may be an example of or include the components of UE 605, UE 705, or a UE 115 as described above, e.g., with reference to FIGS. 6 and 7. Device 905 may include components for bi-directional voice and data communications including components for transmitting and receiving communications, including a communications manager 910, a I/O controller 915, a transceiver 920, an antenna 925, a memory 930, a processor 940, and a software 935. These components may be in electronic communication via one or more buses (e.g., bus 945).

I/O controller 915 may manage input and output signals for device 905. I/O controller 915 may also manage peripherals not integrated into device 905. In some cases, I/O controller 915 may represent a physical connection or port to an external peripheral. In some cases, I/O controller 915 may utilize an operating system such as iOS®, ANDROID®, MS-DOS®, MS-WINDOWS®, OS/2®, UNIX®, LINUX®, or another known operating system. In other cases, I/O controller 915 may represent or interact with a modem, a keyboard, a mouse, a touchscreen, or a similar device. In some cases, I/O controller 915 may be implemented as part of a processor. In some cases, a user may interact with device 905 via I/O controller 915 or via hardware components controlled by I/O controller 915.

Transceiver 920 may communicate bi-directionally, via one or more antennas, wired, or wireless links as described above. For example, transceiver 920 may represent a wireless transceiver and may communicate bi-directionally with another wireless transceiver. Transceiver 920 may also include a modem to modulate the packets and provide the modulated packets to the antennas for transmission, and to demodulate packets received from the antennas.

In some cases, device 905 may include a single antenna 925. However, in some cases device 905 may have more than one antenna 925, which may be capable of concurrently transmitting or receiving multiple wireless transmissions.

Memory 930 may include RAM and ROM. Memory 930 may store computer-readable, computer-executable code 935 including instructions that, when executed, cause the processor to perform various functions described herein. In some cases, memory 930 may contain, among other things, a BIOS which may control basic hardware or software operation such as the interaction with peripheral components or devices.

Processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 940 may be configured to operate a memory array using a memory controller. In other cases, a memory controller may be integrated into processor 940. Processor 940 may be configured to execute computer-readable instructions stored in a memory to perform various functions (e.g., functions or tasks supporting multi-RAT scheduling of sidelink interface).

Code 935 may include code to implement aspects of the present disclosure, including code to support wireless communications. Code 935 may be stored in a non-transitory computer-readable medium such as system memory or other memory. In some cases, code 935 may not be directly executable by the processor but may cause a computer (e.g., when compiled and executed) to perform functions described herein.

Figure 10:
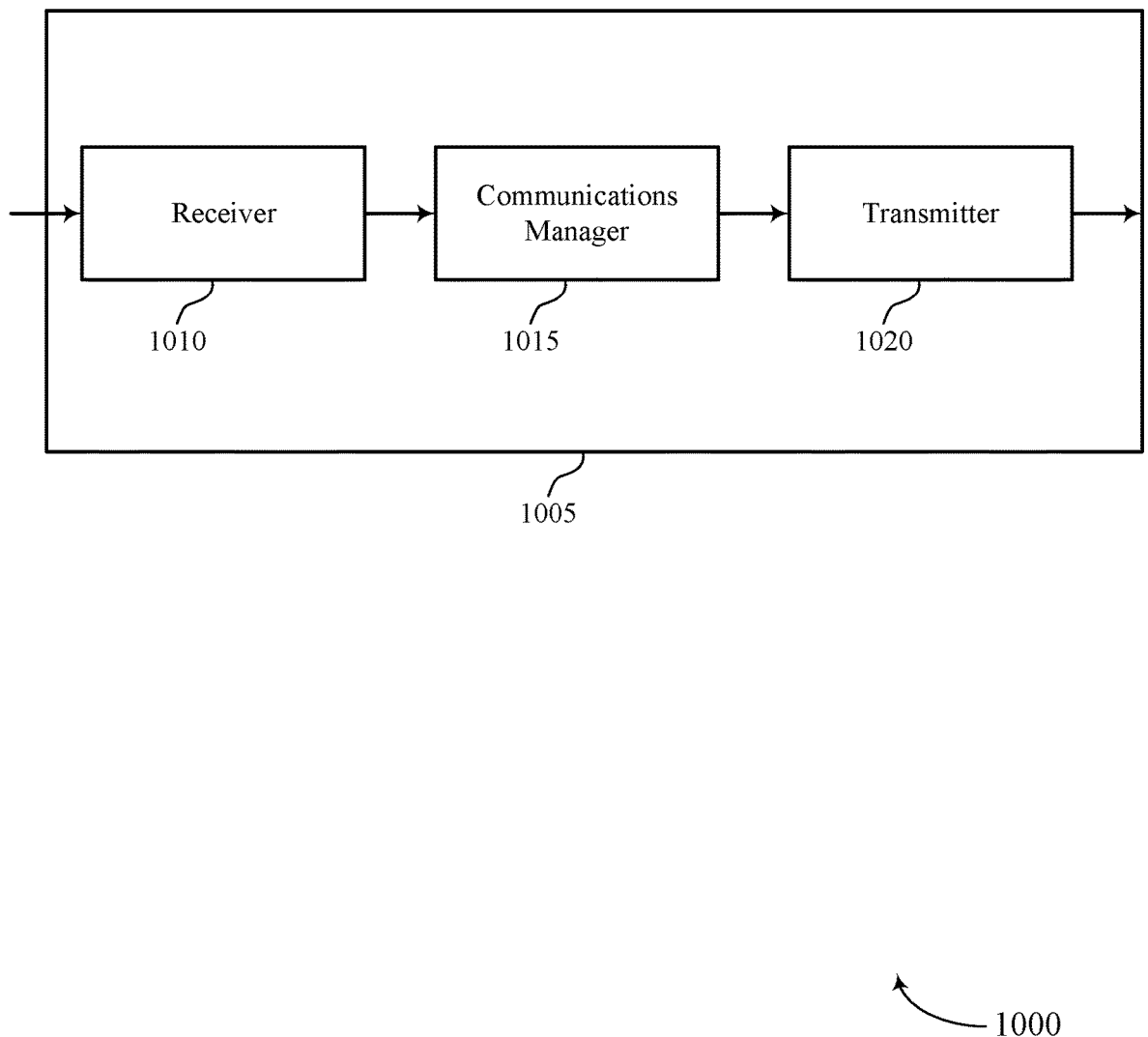
FIGS. 10 and 11 show block diagrams of devices that supports multi-RAT scheduling of sidelink interface in accordance with aspects of the present disclosure.

FIG. 10 shows a block diagram 1000 of a base station 1005 that supports multi-RAT scheduling of sidelink interface in accordance with aspects of the present disclosure. Base station 1005 may be an example of aspects of a base station 105 as described herein. Base station 1005 may include a receiver 1010, a communications manager 1015, and a transmitter 1020. Base station 1005 may also include a processor. Each of these components may be in communication with one another (e.g., via one or more buses).

Receiver 1010 may receive information such as packets, user data, or control information associated with various information channels (e.g., control channels, data channels, and information related to multi-RAT scheduling of sidelink interface, etc.). Information may be passed on to other components of base station 1005. Receiver 1010 may be an example of aspects of a transceiver 1320 described with reference to FIG. 13. Receiver 1010 may utilize a single antenna or a set of antennas.

Communications manager 1015 may receive a sidelink information message from a UE using a first RAT indicating that sidelink communications are to be performed using a second RAT or both the first RAT and the second RAT. Communications manager 1015 may transmit a configuration message to the UE that includes an identifier for the sidelink communications and an indication of available sidelink resources. Communications manager 1015 may receive, based on the configuration message, a request for resources within the available sidelink resources, the request indicating the identifier and a BSR configured based on whether the request for resources is associated with the second RAT or both the first RAT and the second RAT. Communications manager 1015 may be an example of aspects of communications manager 1310 described with reference to FIG. 13.

Communications manager 1015 or its sub-components, may be implemented in hardware, code (e.g., software or firmware) executed by a processor, or any combination thereof. If implemented in code executed by a processor, the functions of communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

Communications manager 1015 or its sub-components, may be physically located at various positions, including being distributed such that portions of functions are implemented at different physical locations by one or more physical devices. In some examples, communications manager 1015 or its sub-components may be a separate and distinct component in accordance with various aspects of the present disclosure. In some examples, communications manager 1015 or its sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1020 may transmit signals generated by other components of the device. In some examples, transmitter 1020 may be collocated with a receiver 1010 in a transceiver module. For example, transmitter 1020 may be an example of aspects of transceiver 1320 described with reference to FIG. 13. Transmitter 1020 may utilize a single antenna or a set of antennas.

Figure 11:
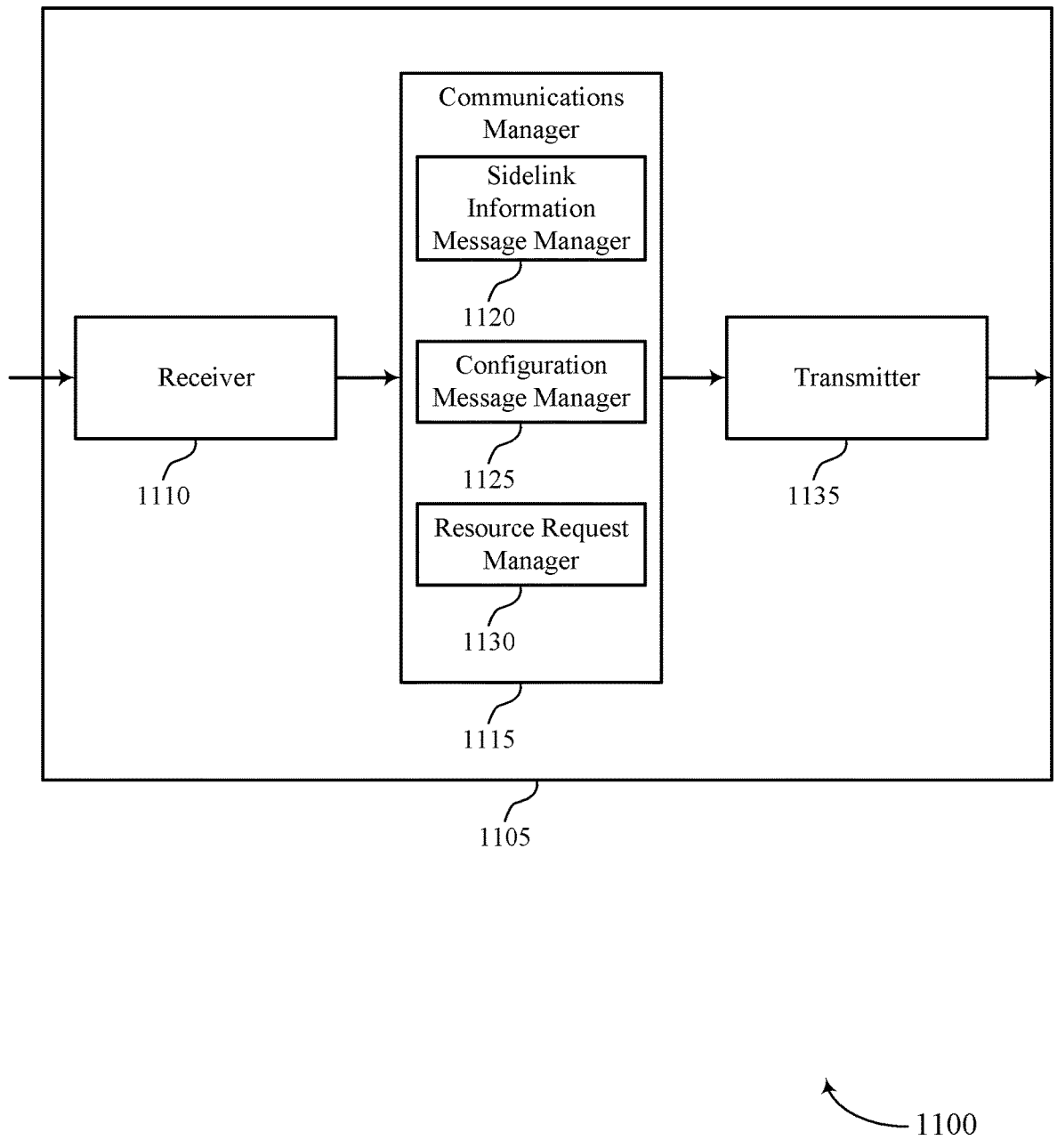

FIG. 11 shows a block diagram 1100 of a device 1105 that supports multi-RAT scheduling of sidelink interface in accordance with aspects of the present disclosure. Device 1105 may be an example of aspects of a base station 1005 or a base station 105 as described with reference to FIGS. 1 and 10. Device 1105 may include a receiver 1110, a communications manager 1115, and a transmitter 1135. Device 1105 may also include a processor. Each of these components may be in communication with one another (e.g., via one or more buses).

Receiver 1110 may receive information such as packets, user data, or control information associated with various information channels (e.g., control channels, data channels, and information related to multi-RAT scheduling of sidelink interface, etc.). Information may be passed on to other components of the device. Receiver 1110 may be an example of aspects of transceiver 1320 described with reference to FIG. 13. Receiver 1110 may utilize a single antenna or a set of antennas.

Communications manager 1115 may also include a sidelink information message manager 1120, a configuration message manager 1125, and a resource request manager 1130. Communications manager 1115 may be an example of aspects of communications manager 1310 described with reference to FIG. 13.

Sidelink information message manager 1120 may receive a sidelink information message from a UE using a first RAT indicating that sidelink communications are to be performed using a second RAT or both the first RAT and the second RAT.

Configuration message manager 1125 may transmit a configuration message to the UE that includes an identifier for the sidelink communications and an indication of available sidelink resources.

Resource request manager 1130 may receive, based on the configuration message, a request for resources within the available sidelink resources, the request indicating the identifier and a BSR configured based on whether the request for resources is associated with the second RAT or both the first RAT and the second RAT.

Transmitter 1135 may transmit signals generated by other components of the device. In some examples, transmitter 1135 may be collocated with a receiver 1110 in a transceiver module. For example, transmitter 1135 may be an example of aspects of transceiver 1320 described with reference to FIG. 13. Transmitter 1135 may utilize a single antenna or a set of antennas.

Figure 12:
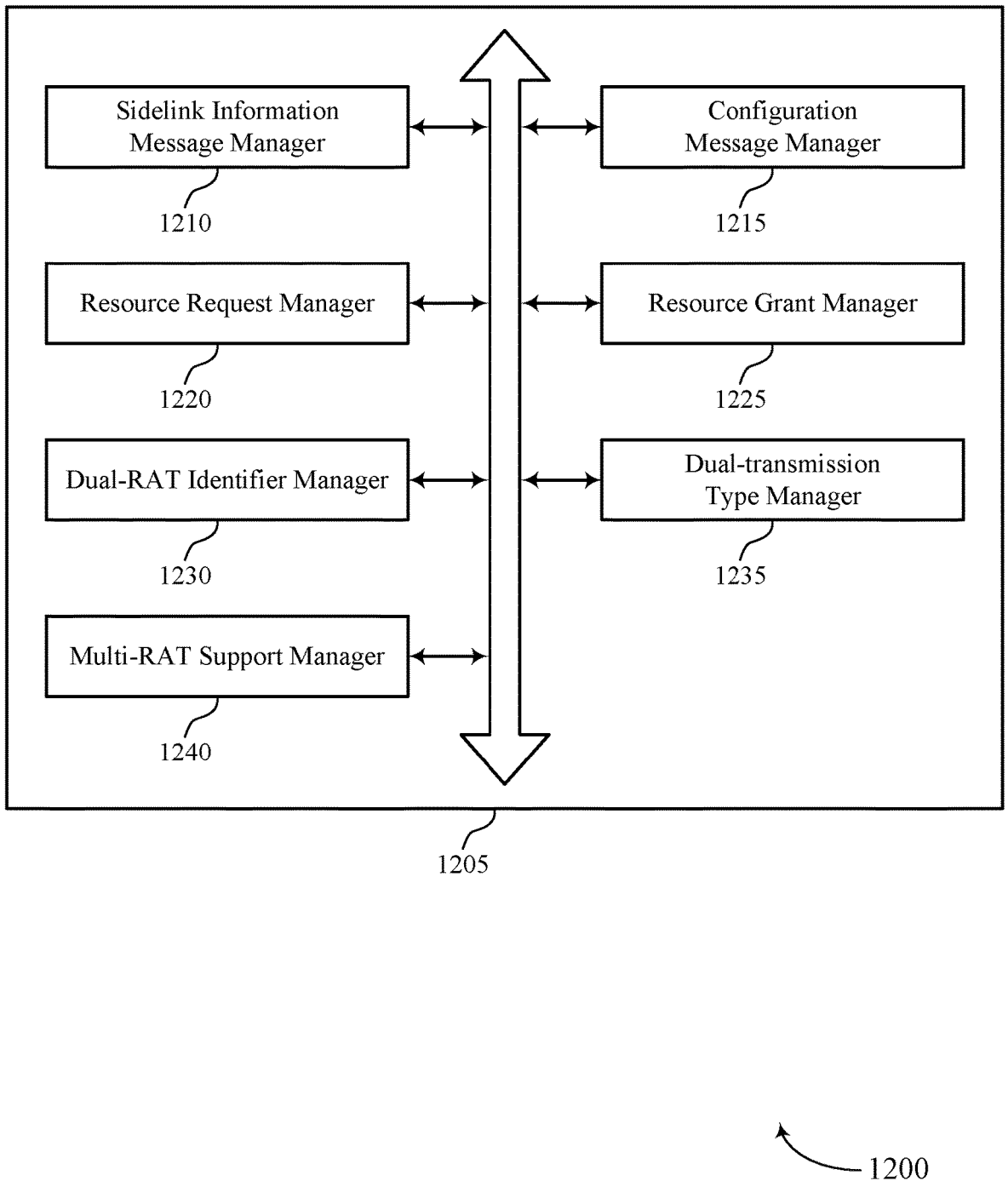
FIG. 12 show a block diagram of a device that supports multi-RAT scheduling of sidelink interface in accordance with aspects of the present disclosure.

FIG. 12 shows a block diagram 1200 of a communications manager 1205 that supports multi-RAT scheduling of sidelink interface in accordance with aspects of the present disclosure. Communications manager 1215 may be an example of aspects of a communications manager 1015, a communications manager 1115, or a communications manager 1310 described with reference to FIGS. 10, 11, and 13. Communications manager 1215 may include a sidelink information message manager 1210, a configuration message manager 1215, a resource request manager 1220, a resource grant manager 1225, a dual-RAT identifier manager 1230, a dual-transmission type manager 1235, and a multi-RAT support manager 1240. Each of these modules may communicate, directly or indirectly, with one another (e.g., via one or more buses).

Sidelink information message manager 1210 may receive a sidelink information message from a UE using a first RAT indicating that sidelink communications are to be performed using a second RAT or both the first RAT and the second RAT. In some cases, the sidelink information message identifies a transmission type (e.g., indicating one or more of normal TTI, URLLC, MiCR, non-MiCR, etc., corresponding to a desired latency and type of resource allocation), a traffic profile, a quality of service indicator, a service type indicator, or any combination thereof, for the sidelink communications.

Configuration message manager 1215 may transmit a configuration message to the UE that includes an identifier for the sidelink communications and an indication of available sidelink resources. In some cases, the identifier is at least one of a LCID or a RNTI. In some cases, the configuration message is an RRC message.

Resource request manager 1220 may receive, based on the configuration message, a request for resources within the available sidelink resources, the request indicating the identifier and a BSR configured based on whether the request for resources is associated with the second RAT or both the first RAT and the second RAT. In some cases, the BSR indicates a buffer status for the first RAT and a buffer status for the second RAT.

Resource grant manager 1225 may generate a resource grant allocating resources within the available sidelink resources to perform the sidelink communications. In some examples, resource grant manager 1225 may scramble the resource grant using the identifier to generate a scrambled resource grant. In some examples, transmitting, in a control channel, DCI that includes the scrambled resource grant.

Dual-RAT identifier manager 1230 may generate a first resource grant allocating first resources within the available sidelink resources to the first RAT and a second resource grant allocating second resources within the available sidelink resources to the second RAT. In some examples, dual-RAT identifier manager 1230 may scramble the first resource grant using the first identifier to generate a first scrambled resource grant. In some examples, dual-RAT identifier manager 1230 may scramble the second resource grant using the second identifier to generate a second scrambled resource grant. In some examples, transmitting, in a control channel, DCI that includes the first scrambled resource grant and the second scrambled resource grant. In some cases, the identifier includes a first identifier associated with the first RAT and a second identifier associated with the second RAT.

Dual-transmission type manager 1235 may generate a first resource grant allocating first resources within the available sidelink resources to the second RAT and a second resource grant allocating second resources within the available sidelink resources to the second RAT. In some examples, dual-transmission type manager 1235 may scramble the first resource grant using the first identifier to generate a first scrambled resource grant. In some examples, dual-transmission type manager 1235 may scramble the second resource grant using the second identifier to generate a second scrambled resource grant. In some examples, transmitting, in a control channel, DCI that includes the first scrambled resource grant and the second scrambled resource grant. In some cases, the identifier includes a first identifier associated with the second RAT and a second identifier associated with the second RAT.

Multi-RAT support manager 1240 may transmit a SIB message indicating support for allocating resources for sidelink communications using the first RAT and the second RAT. In some cases, the first RAT is an LTE RAT and the second RAT is an NR RAT.

Figure 13:
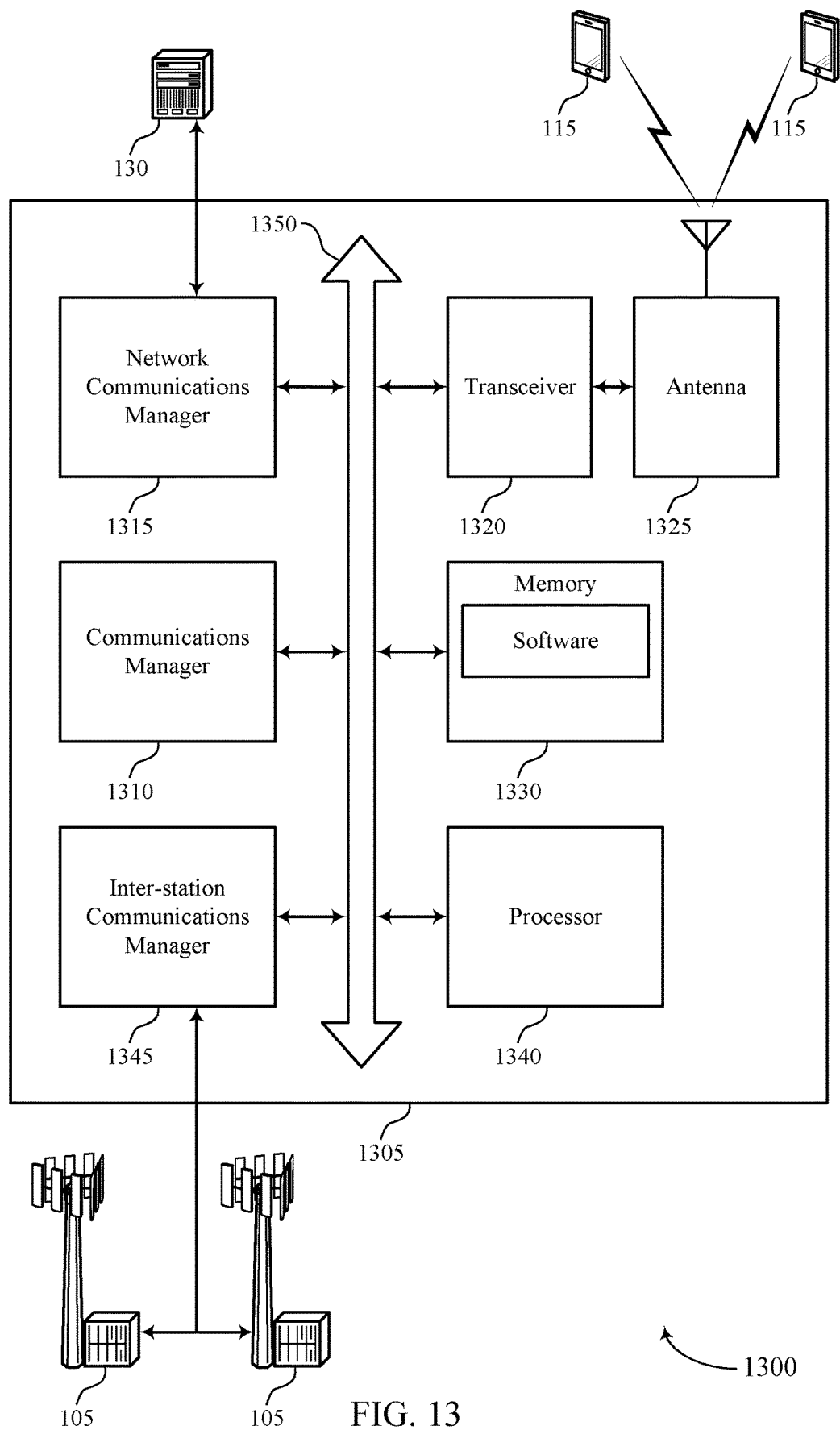
FIG. 13 illustrates a block diagram of a system including a base station that supports multi-RAT scheduling of sidelink interface in accordance with aspects of the present disclosure.

FIG. 13 shows a diagram of a system 1300 including a device 1305 that supports multi-RAT scheduling of sidelink interface in accordance with aspects of the present disclosure. Device 1305 may be an example of or include the components of base station 1005, base station 1105, or a base station 105 as described above, e.g., with reference to FIGS. 10 and 11. Device 1305 may include components for bi-directional voice and data communications including components for transmitting and receiving communications, including a communications manager 1310, a network communications manager 1315, a transceiver 1320, an antenna 1325, a memory 1330, a processor 1340, an inter-station communications manager 1345, and a software 1335. These components may be in electronic communication via one or more buses (e.g., bus 1350).

Network communications manager 1315 may manage communications with the core network (e.g., via one or more wired backhaul links). For example, network communications manager 1315 may manage the transfer of data communications for client devices, such as one or more UEs 115.

Transceiver 1320 may communicate bi-directionally, via one or more antennas, wired, or wireless links as described above. For example, transceiver 1320 may represent a wireless transceiver and may communicate bi-directionally with another wireless transceiver. Transceiver 1320 may also include a modem to modulate the packets and provide the modulated packets to the antennas for transmission, and to demodulate packets received from the antennas.

In some cases, device 1305 may include a single antenna 1325. However, in some cases device 1305 may have more than one antenna 1325, which may be capable of concurrently transmitting or receiving multiple wireless transmissions.

Memory 1330 may include RAM and ROM. Memory 1330 may store computer-readable, computer-executable code 1335 including instructions that, when executed, cause the processor to perform various functions described herein. In some cases, memory 1330 may contain, among other things, a BIOS which may control basic hardware or software operation such as the interaction with peripheral components or devices.

Processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1340 may be configured to operate a memory array using a memory controller. In other cases, a memory controller may be integrated into processor 1340. Processor 1340 may be configured to execute computer-readable instructions stored in a memory to perform various functions (e.g., functions or tasks supporting multi-RAT scheduling of sidelink interface).

Inter-station communications manager 1345 may manage communications with other base station 105 and may include a controller or scheduler for controlling communications with UEs 115 in cooperation with other base stations 105. For example, inter-station communications manager 1345 may coordinate scheduling for transmissions to UEs 115 for various interference mitigation techniques such as beamforming or joint transmission. In some examples, inter-station communications manager 1345 may provide an X2 interface within an LTE/LTE-A wireless communication network technology to provide communication between base stations 105.

Code 1335 may include code to implement aspects of the present disclosure, including code to support wireless communications. Code 1335 may be stored in a non-transitory computer-readable medium such as system memory or other memory. In some cases, code 1335 may not be directly executable by the processor but may cause a computer (e.g., when compiled and executed) to perform functions described herein.

Figure 14:
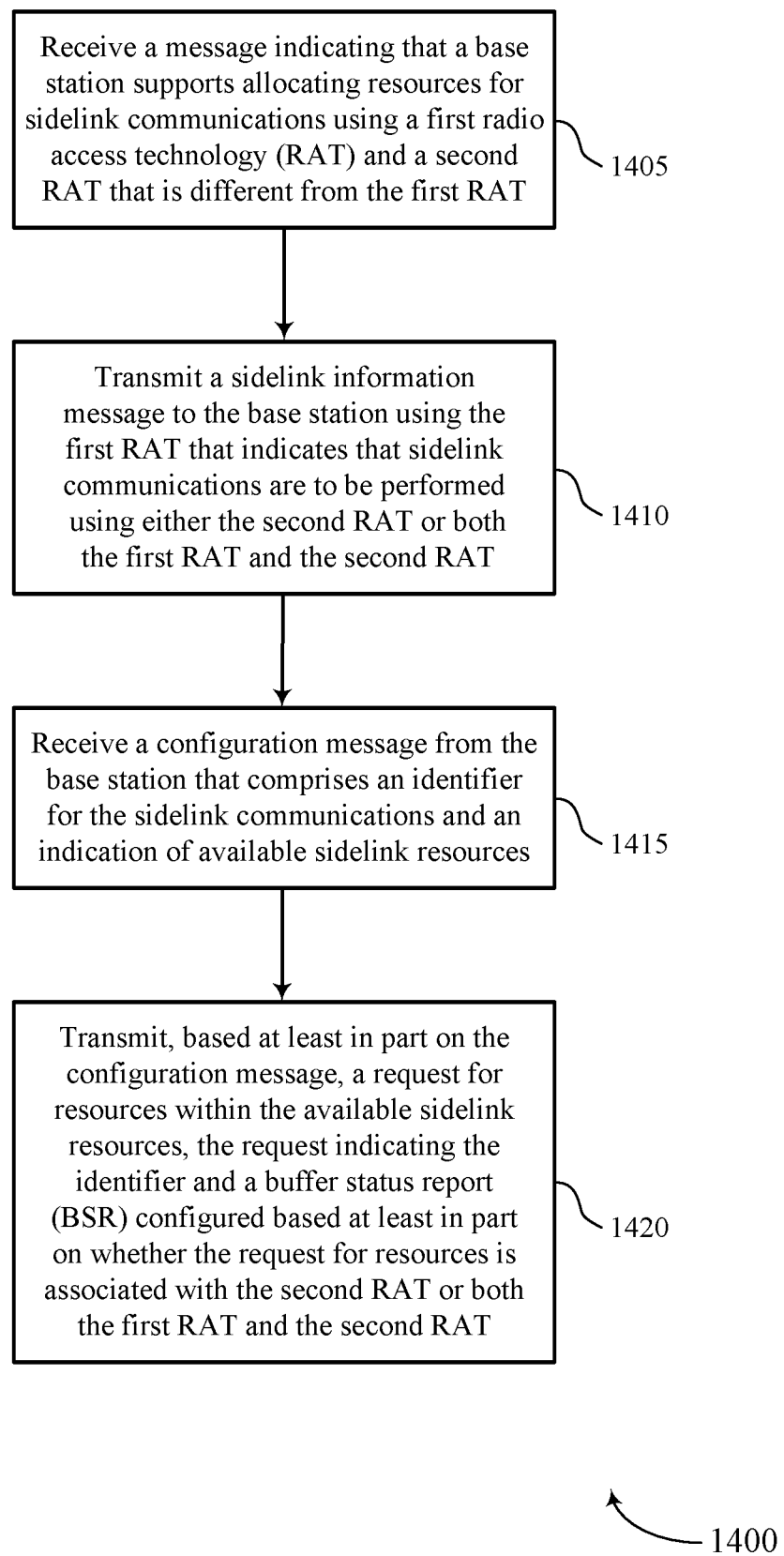
FIGS. 14 through 17 illustrate methods for multi-RAT scheduling of sidelink interface in accordance with aspects of the present disclosure.

FIG. 14 shows a flowchart illustrating a method 1400 for multi-RAT scheduling of sidelink interface in accordance with aspects of the present disclosure. The operations of method 1400 may be implemented by a UE or its components as described herein. For example, the operations of method 1400 may be performed by a communications manager as described with reference to FIGS. 6 to 9. In some examples, a UE may execute a set of instructions to control the functional elements of the UE to perform the functions described below. Additionally, or alternatively, a UE may perform aspects of the functions described below using special-purpose hardware.

At 1405, the UE may receive a message indicating that a base station supports allocating resources for sidelink communications using a first RAT and a second RAT that is different from the first RAT. The operations of 1405 may be performed according to the methods described herein. In some examples, aspects of the operations of 1405 may be performed by a multi-RAT support manager as described with reference to FIGS. 6 to 9.

At 1410, the UE may transmit a sidelink information message to the base station using the first RAT that indicates that sidelink communications are to be performed using either the second RAT or both the first RAT and the second RAT. The operations of 1410 may be performed according to the methods described herein. In some examples, aspects of the operations of 1410 may be performed by a sidelink information message manager as described with reference to FIGS. 6 to 9.

At 1415, the UE may receive a configuration message from the base station that comprises an identifier for the sidelink communications and an indication of available sidelink resources. The operations of 1415 may be performed according to the methods described herein. In some examples, aspects of the operations of 1415 may be performed by a configuration message manager as described with reference to FIGS. 6 to 9.

At 1420, the UE may transmit, based at least in part on the configuration message, a request for resources within the available sidelink resources, the request indicating the identifier and a BSR configured based at least in part on whether the request for resources is associated with the second RAT or both the first RAT and the second RAT. The operations of 1420 may be performed according to the methods described herein. In some examples, aspects of the operations of 1420 may be performed by a resource request manager as described with reference to FIGS. 6 to 9.

Figure 15:
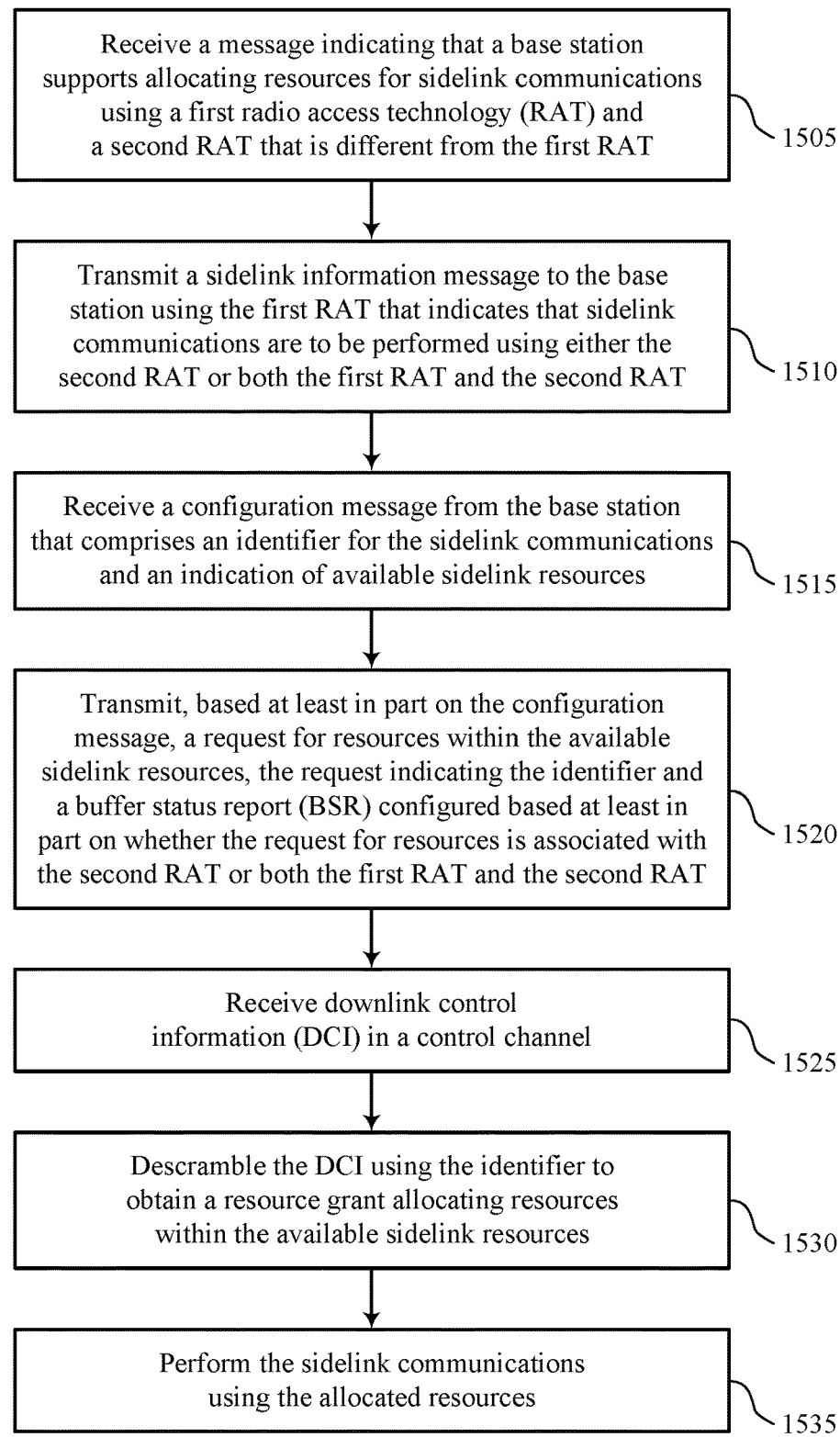

FIG. 15 shows a flowchart illustrating a method 1500 for multi-RAT scheduling of sidelink interface in accordance with aspects of the present disclosure. The operations of method 1500 may be implemented by a UE or its components as described herein. For example, the operations of method 1500 may be performed by a communications manager as described with reference to FIGS. 6 to 9. In some examples, a UE may execute a set of instructions to control the functional elements of the UE to perform the functions described below. Additionally, or alternatively, a UE may perform aspects of the functions described below using special-purpose hardware.

At 1505, the UE may receive a message indicating that a base station supports allocating resources for sidelink communications using a first RAT and a second RAT that is different from the first RAT. The operations of 1505 may be performed according to the methods described herein. In some examples, aspects of the operations of 1505 may be performed by a multi-RAT support manager as described with reference to FIGS. 6 to 9.

At 1510, the UE may transmit a sidelink information message to the base station using the first RAT that indicates that sidelink communications are to be performed using either the second RAT or both the first RAT and the second RAT. The operations of 1510 may be performed according to the methods described herein. In some examples, aspects of the operations of 1510 may be performed by a sidelink information message manager as described with reference to FIGS. 6 to 9.

At 1515, the UE may receive a configuration message from the base station that comprises an identifier for the sidelink communications and an indication of available sidelink resources. The operations of 1515 may be performed according to the methods described herein. In some examples, aspects of the operations of 1515 may be performed by a configuration message manager as described with reference to FIGS. 6 to 9.

At 1520, the UE may transmit, based at least in part on the configuration message, a request for resources within the available sidelink resources, the request indicating the identifier and a BSR configured based at least in part on whether the request for resources is associated with the second RAT or both the first RAT and the second RAT. The operations of 1520 may be performed according to the methods described herein. In some examples, aspects of the operations of 1520 may be performed by a resource request manager as described with reference to FIGS. 6 to 9.

At 1525, the UE may receive DCI in a control channel. The operations of 1525 may be performed according to the methods described herein. In some examples, aspects of the operations of 1525 may be performed by a resource grant manager as described with reference to FIGS. 6 to 9.

At 1530, the UE may descramble the DCI using the identifier to obtain a resource grant allocating resources within the available sidelink resources. The operations of 1530 may be performed according to the methods described herein. In some examples, aspects of the operations of 1530 may be performed by a resource grant manager as described with reference to FIGS. 6 to 9.

At 1535, the UE may perform the sidelink communications using the allocated resources. The operations of 1535 may be performed according to the methods described herein. In some examples, aspects of the operations of 1535 may be performed by a resource grant manager as described with reference to FIGS. 6 to 9.

Figure 16:
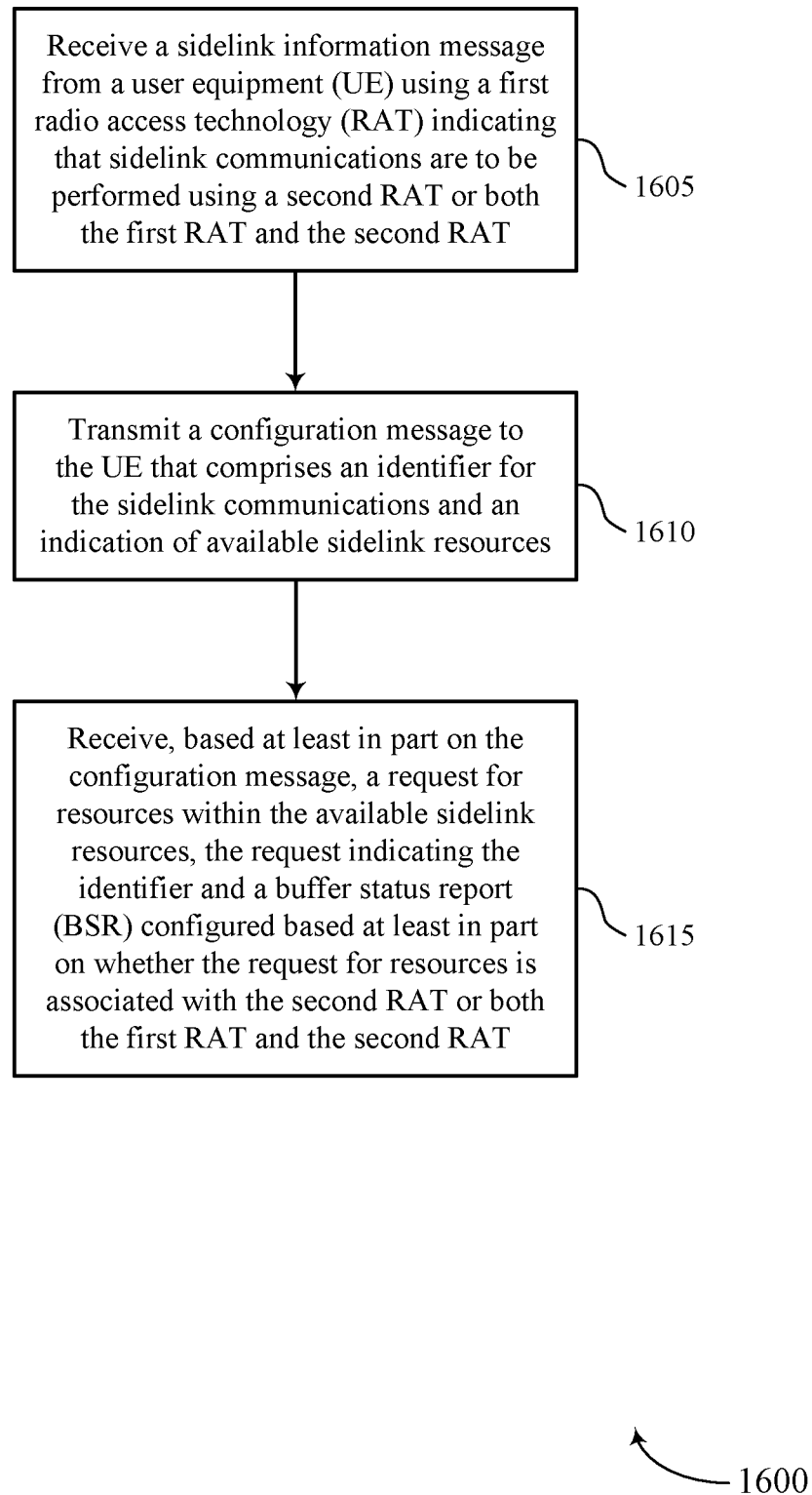

FIG. 16 shows a flowchart illustrating a method 1600 for multi-RAT scheduling of sidelink interface in accordance with aspects of the present disclosure. The operations of method 1600 may be implemented by a base station or its components as described herein. For example, the operations of method 1600 may be performed by a communications manager as described with reference to FIGS. 10 to 13. In some examples, a base station may execute a set of instructions to control the functional elements of the base station to perform the functions described below. Additionally, or alternatively, a base station may perform aspects of the functions described below using special-purpose hardware.

At 1605, the base station may receive a sidelink information message from a UE using a first RAT indicating that sidelink communications are to be performed using a second RAT or both the first RAT and the second RAT. The operations of 1605 may be performed according to the methods described herein. In some examples, aspects of the operations of 1605 may be performed by a sidelink information message manager as described with reference to FIGS. 10 to 13.

At 1610, the base station may transmit a configuration message to the UE that comprises an identifier for the sidelink communications and an indication of available sidelink resources. The operations of 1610 may be performed according to the methods described herein. In some examples, aspects of the operations of 1610 may be performed by a configuration message manager as described with reference to FIGS. 10 to 13.

At 1615, the base station may receive, based at least in part on the configuration message, a request for resources within the available sidelink resources, the request indicating the identifier and a BSR configured based at least in part on whether the request for resources is associated with the second RAT or both the first RAT and the second RAT. The operations of 1615 may be performed according to the methods described herein. In some examples, aspects of the operations of 1615 may be performed by a resource request manager as described with reference to FIGS. 10 to 13.

Figure 17:
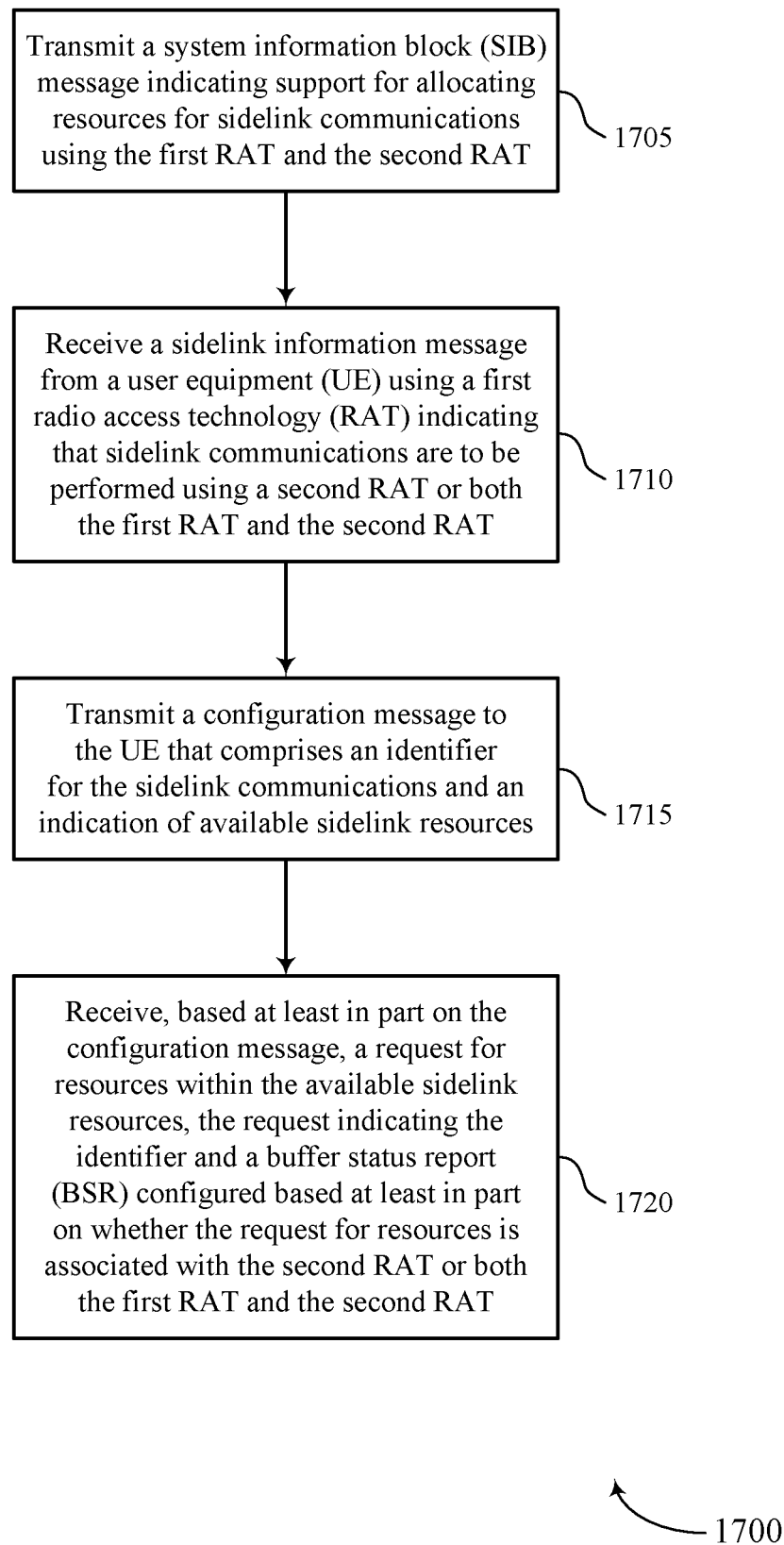

FIG. 17 shows a flowchart illustrating a method 1700 for multi-RAT scheduling of sidelink interface in accordance with aspects of the present disclosure. The operations of method 1700 may be implemented by a base station or its components as described herein. For example, the operations of method 1700 may be performed by a communications manager as described with reference to FIGS. 10 to 13. In some examples, a base station may execute a set of instructions to control the functional elements of the base station to perform the functions described below. Additionally, or alternatively, a base station may perform aspects of the functions described below using special-purpose hardware.

At 1705 the base station may transmit a SIB message indicating support for allocating resources for sidelink communications using the first RAT and the second RAT. The operations of 1705 may be performed according to the methods described herein. In some examples, aspects of the operations of 1705 may be performed by a multi-RAT support manager as described with reference to FIGS. 10 to 13.

At 1710, the base station may receive a sidelink information message from a UE using a first RAT indicating that sidelink communications are to be performed using a second RAT or both the first RAT and the second RAT. The operations of 1710 may be performed according to the methods described herein. In some examples, aspects of the operations of 1710 may be performed by a sidelink information message manager as described with reference to FIGS. 10 to 13.

At 1715, the base station may transmit a configuration message to the UE that comprises an identifier for the sidelink communications and an indication of available sidelink resources. The operations of 1715 may be performed according to the methods described herein. In some examples, aspects of the operations of 1715 may be performed by a configuration message manager as described with reference to FIGS. 10 to 13.

At 1720, the base station may receive, based at least in part on the configuration message, a request for resources within the available sidelink resources, the request indicating the identifier and a BSR configured based at least in part on whether the request for resources is associated with the second RAT or both the first RAT and the second RAT. The operations of 1720 may be performed according to the methods described herein. In some examples, aspects of the operations of 1720 may be performed by a resource request manager as described with reference to FIGS. 10 to 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving one or more messages indicating that a base station supports allocating resources for sidelink communications using a first interface and a New Radio (NR) PC5 interface;
   transmitting one or more sidelink information message to the base station using the first interface that indicates that sidelink communications are to be performed using either the NR PC5 interface or both the first interface and the NR PC5 interface;
   receiving a configuration message from the base station that comprises an indication of available sidelink resources; and
   transmitting, based at least in part on the configuration message, a request for resources within the available sidelink resources, wherein the request for resources is based at least in part on whether the request for resources is associated with the NR PC5 interface or both the first interface and the NR PC5 interface.

2. The method of claim 1, further comprising:
   receiving downlink control information (DCI) in a control channel;
   descrambling the DCI to obtain a resource grant allocating resources within the available sidelink resources; and
   performing the sidelink communications using the allocated resources.

3. The method of claim 1, further comprising:
   receiving downlink control information (DCI) in a control channel;
   descrambling the DCI for determining whether the DCI includes a resource grant allocating resources to the first interface; and
   descrambling the DCI for determining whether the DCI includes a resource grant allocating resources to the NR PC5 interface.

4. The method of claim 1, further comprising:
   receiving downlink control information (DCI) in a control channel;
   descrambling the DCI for determining whether the DCI includes a resource grant allocating resources to the NR PC5 interface associated with a first transmission type; and
   descrambling the DCI for determining whether the DCI includes a resource grant allocating resources to the NR PC5 interface associated with a second transmission type.

5. The method of claim 1, wherein the one or more sidelink information message indicates a transmission type, a traffic profile, a quality of service indicator, a service type indicator, or any combination thereof, for the sidelink communications.

6. The method of claim 1, wherein the configuration message indicates a mapping assignment for a logical channel associated with the first interface or the NR PC5 interface.

7. The method of claim 1, wherein the configuration message is a radio resource control (RRC) message.

8. The method of claim 1, wherein the one or more messages is a system information block (SIB) message that is broadcast by the base station.

9. The method of claim 1, wherein the first interface is associated with a Long Term Evolution (LTE) Radio Access Technology (RAT) and the NR PC5 interface is associated with an NR RAT.

10. The method of claim 1, wherein the first interface is a legacy interface.

11. A method for wireless communication at a base station, comprising:
    receiving one or more sidelink information message from a user equipment (UE) using a first interface indicating that sidelink communications are to be performed using a New Radio (NR) PC5 interface or both the first interface and the NR PC5 interface;
    transmitting a configuration message to the UE that comprises an indication of available sidelink resources; and
    receiving, based at least in part on the configuration message, a request for resources within the available sidelink resources, wherein the request for resources is based at least in part on whether the request for resources is associated with the NR PC5 interface or both the first interface and the NR PC5 interface.

12. The method of claim 11, further comprising:
    generating a resource grant allocating resources within the available sidelink resources to perform the sidelink communications;
    scrambling the resource grant to generate a scrambled resource grant; and
    transmitting, in a control channel, downlink control information (DCI) that comprises the scrambled resource grant.

13. The method of claim 11, further comprising:
    generating a first resource grant allocating first resources within the available sidelink resources to the first interface and a second resource grant allocating second resources within the available sidelink resources to the NR PC5 interface;
    scrambling the first resource grant to generate a first scrambled resource grant;
    scrambling the second resource grant to generate a second scrambled resource grant; and
    transmitting, in a control channel, downlink control information (DCI) that comprises the first scrambled resource grant and the second scrambled resource grant.

14. The method of claim 11, further comprising:
generating a first resource grant allocating first resources within the available sidelink resources to the NR PC5 interface and a second resource grant allocating second resources within the available sidelink resources to the NR PC5 interface;
scrambling the first resource grant to generate a first scrambled resource grant;
scrambling the second resource grant to generate a second scrambled resource grant; and
transmitting, in a control channel, downlink control information (DCI) that comprises the first scrambled resource grant and the second scrambled resource grant.

15. The method of claim 11, wherein the one or more sidelink information message identifies a transmission type, a traffic profile, a quality of service indicator, a service type indicator, or any combination thereof, for the sidelink communications.

16. The method of claim 11, wherein the configuration message is a radio resource control (RRC) message.

17. The method of claim 11, further comprising:
transmitting a system information block (SIB) message indicating support for allocating resources for sidelink communications using the first interface and the NR PC5 interface.

18. The method of claim 11, wherein the first interface is associated with a Long Term Evolution (LTE) Radio Access Technology (RAT) and the NR PC5 interface is associated with an NR RAT.

19. The method of claim 11, wherein the first interface is a legacy interface.

20. An apparatus for wireless communications, comprising:
at least one processor,
at least one memory in electronic communication with the at least one processor; and
instructions stored in the at least one memory and executable by the at least one processor individually or collectively, to cause the apparatus to:
receive one or more messages indicating that a base station supports allocating resources for sidelink communications using a first interface and a New Radio (NR) PC5 interface that is different from the first interface;
transmit one or more sidelink information messages to the base station using the first interface that indicates that sidelink communications are to be performed using either the NR PC5 interface or both the first interface and the NR PC5 interface;
receive a configuration message from the base station that comprises an indication of available sidelink resources; and
transmit, based at least in part on the configuration message, a request for resources within the available sidelink resources, wherein the request for resources is based at least in part on whether the request for resources is associated with the NR PC5 interface or both the first interface and the NR PC5 interface.

21. The apparatus of claim 20, wherein the instructions are further executable by the at least one processor to cause the apparatus to:
receive downlink control information (DCI) in a control channel;
descramble the DCI to obtain a resource grant allocating resources within the available sidelink resources; and
perform the sidelink communications using the allocated resources.

22. An apparatus for wireless communications, comprising:
at least one processor,
at least one memory in electronic communication with the at least one processor; and
instructions stored in the at least one memory and executable by the at least one processor individually or collectively, to cause the apparatus to:
receive one or more sidelink information messages from a user equipment (UE) using a first interface indicating that sidelink communications are to be performed using a New Radio (NR) PC5 interface or both the first interface and the NR PC5 interface;
transmit a configuration message to the UE that comprises an indication of available sidelink resources; and
receive, based at least in part on the configuration message, a request for resources within the available sidelink resources, wherein the request for resources is based at least in part on whether the request for resources is associated with the NR PC5 interface or both the first interface and the NR PC5 interface.

* * * * *